(12) United States Patent
Van Wagoner et al.

(10) Patent No.: US 8,878,042 B2
(45) Date of Patent: Nov. 4, 2014

(54) STRINGED INSTRUMENT PRACTICE DEVICE AND SYSTEM

(71) Applicants: Gavin Van Wagoner, Salt Lake City, UT (US); Michael B. Dodd, Salt Lake City, UT (US)

(72) Inventors: Gavin Van Wagoner, Salt Lake City, UT (US); Michael B. Dodd, Salt Lake City, UT (US)

(73) Assignee: Pocket Strings, LLC, Salt Lake City, UT (US)

( * ) Notice: Subject to any disclaimer, the term of this patent is extended or adjusted under 35 U.S.C. 154(b) by 139 days.

(21) Appl. No.: 13/742,323

(22) Filed: Jan. 15, 2013

(65) Prior Publication Data

US 2013/0180384 A1    Jul. 18, 2013

Related U.S. Application Data

(60) Provisional application No. 61/587,262, filed on Jan. 17, 2012.

(51) Int. Cl.

| | |
|---|---|
| *G10D 1/08* | (2006.01) |
| *G10H 1/32* | (2006.01) |
| *G10G 1/02* | (2006.01) |
| *G09B 15/00* | (2006.01) |
| *G09B 15/06* | (2006.01) |

(52) U.S. Cl.
CPC .............. *G10G 1/02* (2013.01); *G09B 15/003* (2013.01); *G09B 15/06* (2013.01)
USPC ............ 84/609; 84/293; 84/314 R; 84/477 R; 84/644

(58) Field of Classification Search
USPC ........................................................ 84/609
See application file for complete search history.

(56) References Cited

U.S. PATENT DOCUMENTS

| | | | |
|---|---|---|---|
| 936,181 | A | 10/1909 | Steckelberg |
| 1,841,398 | A | 1/1932 | Bergh |
| 1,848,920 | A | 3/1932 | Watson |
| 1,993,647 | A | 3/1935 | Cerrone |

(Continued)

FOREIGN PATENT DOCUMENTS

GB    2419218 A    4/2006

OTHER PUBLICATIONS

"Written Opinion of the International Searching Authority", Mailed Date: Jul. 17, 2012 Application No. PCT/US2012/029897, Filed Date: Mar. 21, 2012, pp. 5.

(Continued)

*Primary Examiner* — Christopher Uhlir
(74) *Attorney, Agent, or Firm* — Michael B. Dodd; Dodd Law Group

(57) ABSTRACT

The present invention extends to practice devices and systems for practicing to play stringed instruments. An electronic stringed instrument practice device can be configured to perform one or more of the following: detect when finger positions and/or string to fret contact on a finger or fret board forms an appropriate musical note or musical chord, visually indicate appropriate positions on a finger or fret board for forming a musical note or musical chord, and detect when strings have been selected (e.g., strummed). The electronic stringed instrument practice device can emit sound in the form of musical notes and chords. The electronic stringed instrument practice device can include communication modules for communicating with other computing devices, including mobile phones and tablets. The electronic stringed instrument practice device can interact with applications on other computing devices to further assist users in learning how to play a stringed musical instrument.

19 Claims, 27 Drawing Sheets

(56) References Cited

U.S. PATENT DOCUMENTS

| | | | |
|---|---|---|---|
| 3,218,904 A * | 11/1965 | Hartman | 84/485 R |
| 3,403,590 A | 10/1968 | Quinton | |
| 3,668,967 A | 6/1972 | Malis | |
| 3,894,468 A * | 7/1975 | Dunlap | 84/314 R |
| 4,031,801 A | 6/1977 | Cecchini | |
| 4,065,995 A | 1/1978 | Greer | |
| 4,112,804 A | 9/1978 | Cecchini | |
| D284,203 S | 6/1986 | Landau | |
| 4,794,838 A * | 1/1989 | Corrigau, III | 84/600 |
| 4,987,815 A | 1/1991 | Shockley | |
| D327,288 S | 6/1992 | Oreo | |
| 5,337,643 A * | 8/1994 | Cantrell | 84/293 |
| 5,756,914 A | 5/1998 | Streibl | |
| 5,952,593 A | 9/1999 | Wilder | |
| 5,952,595 A | 9/1999 | Carnell | |
| D425,106 S | 5/2000 | Park | |
| 6,127,615 A | 10/2000 | Rosenberg | |
| 6,452,080 B1 | 9/2002 | Coonce | |
| 6,452,081 B1 | 9/2002 | Ravagni et al. | |
| 6,911,011 B2 | 6/2005 | Haag | |
| 7,064,260 B2 | 6/2006 | Willard | |
| D529,092 S | 9/2006 | Ambrose, Sr. | |
| 7,157,633 B1 | 1/2007 | Kopesec | |
| 7,230,175 B2 | 6/2007 | Whiteside | |
| 7,262,354 B2 | 8/2007 | Orred et al. | |
| 7,304,224 B1 | 12/2007 | Bettis et al. | |
| D574,037 S | 7/2008 | LeGrady et al. | |
| 7,598,449 B2 | 10/2009 | Sullivan | |
| 7,897,866 B2 | 3/2011 | Sullivan | |
| 8,022,288 B2 | 9/2011 | Sullivan | |
| 8,124,863 B2 | 2/2012 | Van Wagoner | |
| 8,173,887 B2 | 5/2012 | Sullivan | |
| 8,415,550 B2 | 4/2013 | Sullivan | |
| 2005/0039592 A1 | 2/2005 | Willard | |
| 2005/0109196 A1 | 5/2005 | Horwitz | |
| 2005/0132870 A1 | 6/2005 | Sakurai et al. | |
| 2006/0032364 A1 | 2/2006 | Ludwig | |
| 2007/0012159 A1 | 1/2007 | Babicz | |
| 2008/0105108 A1 | 5/2008 | Saenz | |
| 2010/0083808 A1 | 4/2010 | Sullivan | |
| 2011/0239848 A1 | 10/2011 | Beck | |
| 2012/0017748 A1 | 1/2012 | Beck | |
| 2012/0022796 A1 | 1/2012 | Beck | |
| 2012/0073419 A1 | 3/2012 | Van Wagoner | |
| 2012/0132057 A1 | 5/2012 | Ole Juul Kristensen | |
| 2012/0240744 A1 | 9/2012 | Van Wagoner et al. | |
| 2013/0180389 A1 | 7/2013 | Sullivan | |

OTHER PUBLICATIONS

"Written Opinion of the International Searching Authority", Mailed Date: Mar. 22, 2013 Application No. PCT/US2013/021785, Filed Date: Jan. 17, 2013, pp. 6.

Notice of Allowance, U.S. Appl. No. 13/424,134, mailing date Apr. 3, 2013, pp. 14.

Final Office Action, U.S. Appl. No. 13/313,835, mailing date Apr. 11, 2013, pp. 13.

Pocketstrings takes guitar practice on the road, Noel Mckeegan, Jan. 22, 2012, viewed at http://www.gizmag.com/pocketstrings-guitar-practice-tool/21160.

Notice of Allowance from U.S. Appl. No. 12/904,861, mailed Oct. 18, 2011.

Non-Final Office Action from U.S. Appl. No. 13/313,835, mailed Nov. 5, 2012.

* cited by examiner

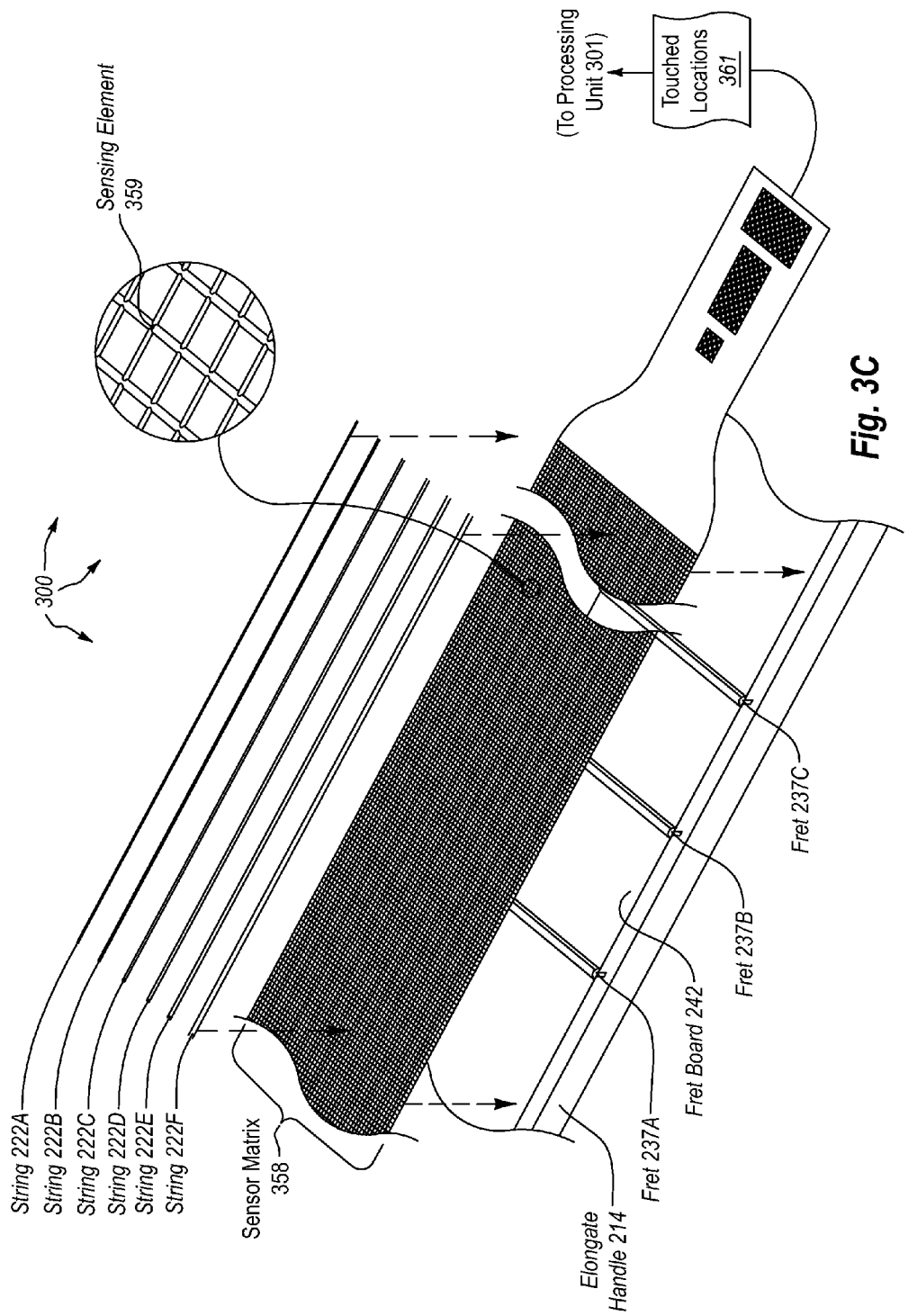

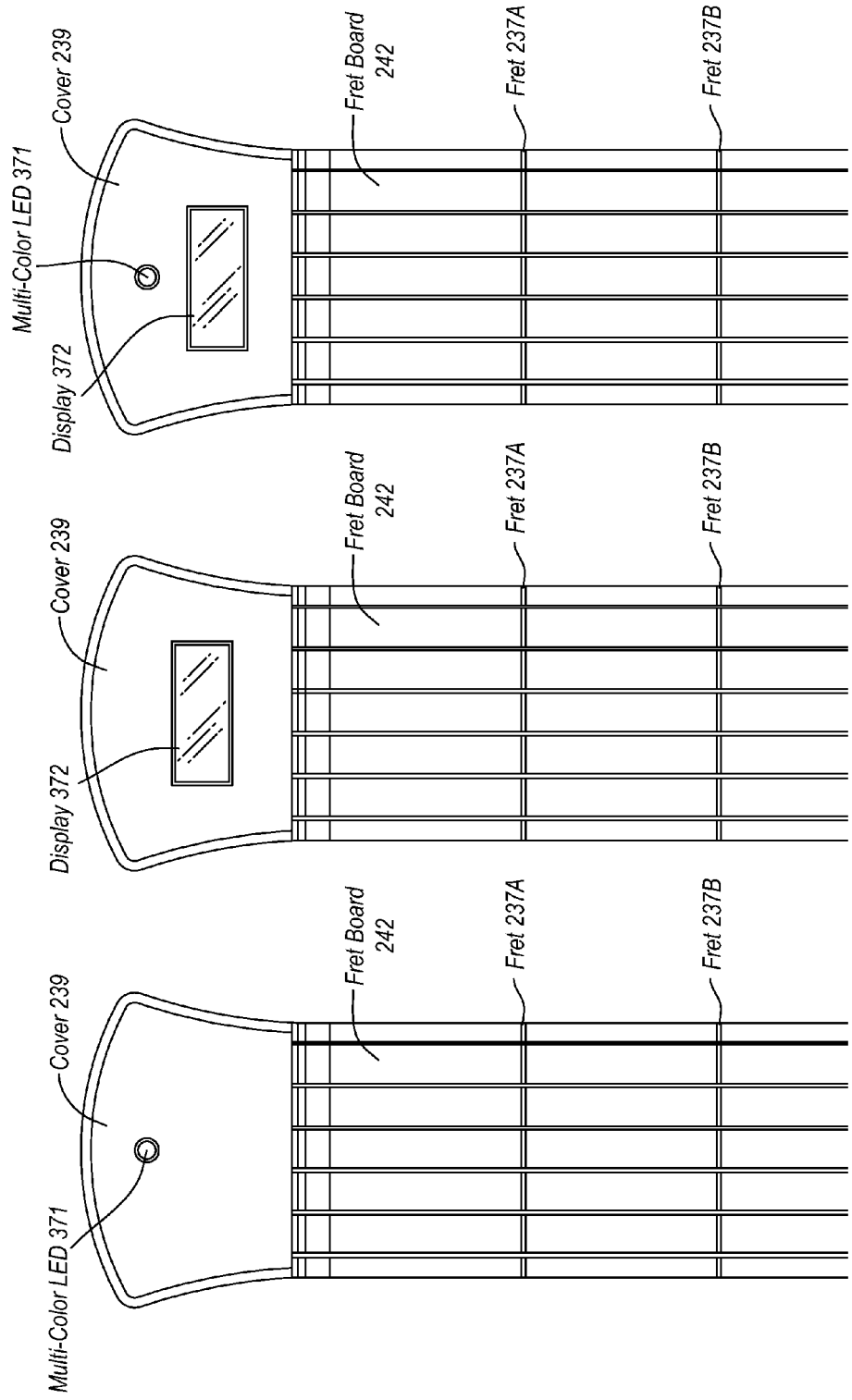

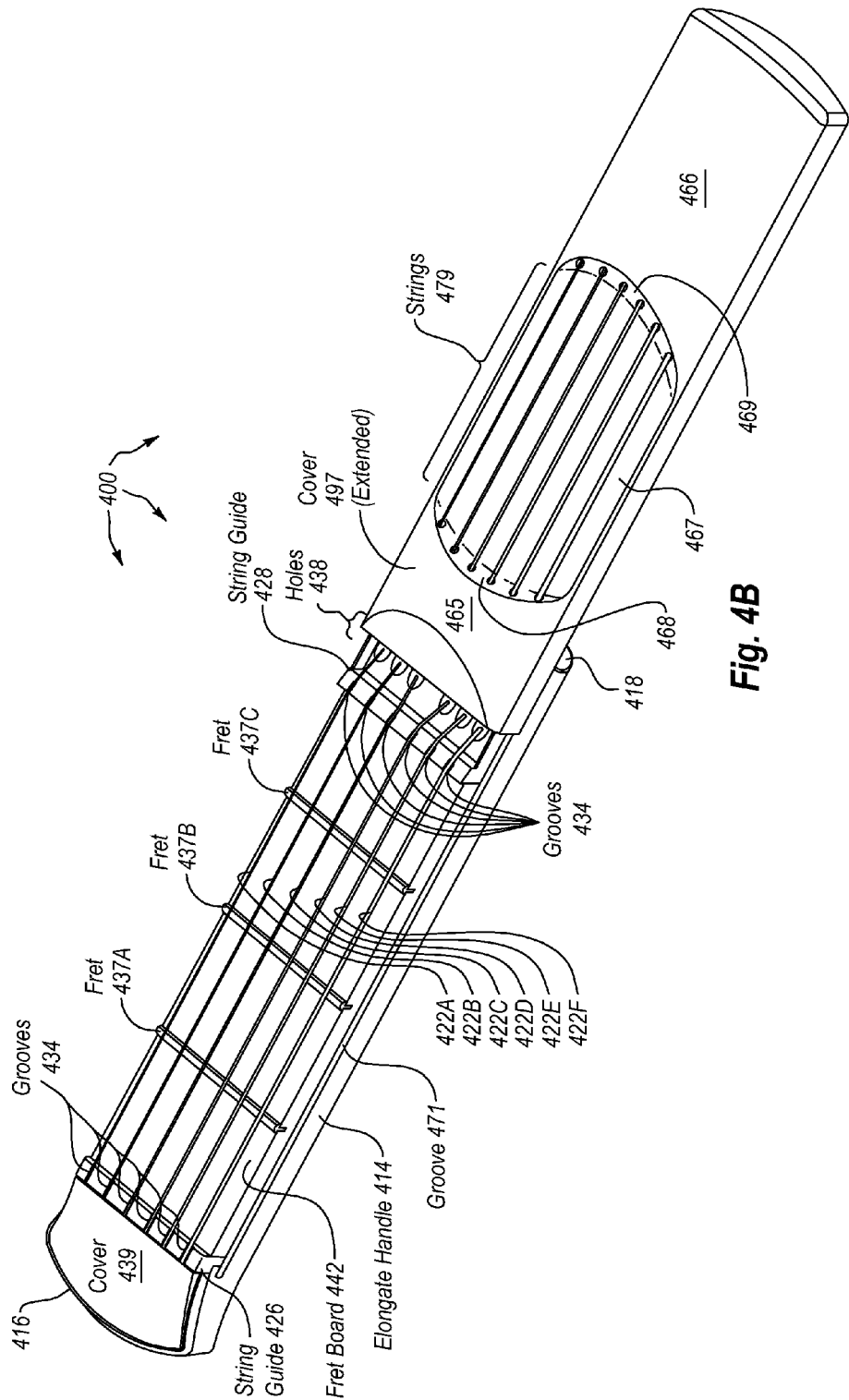

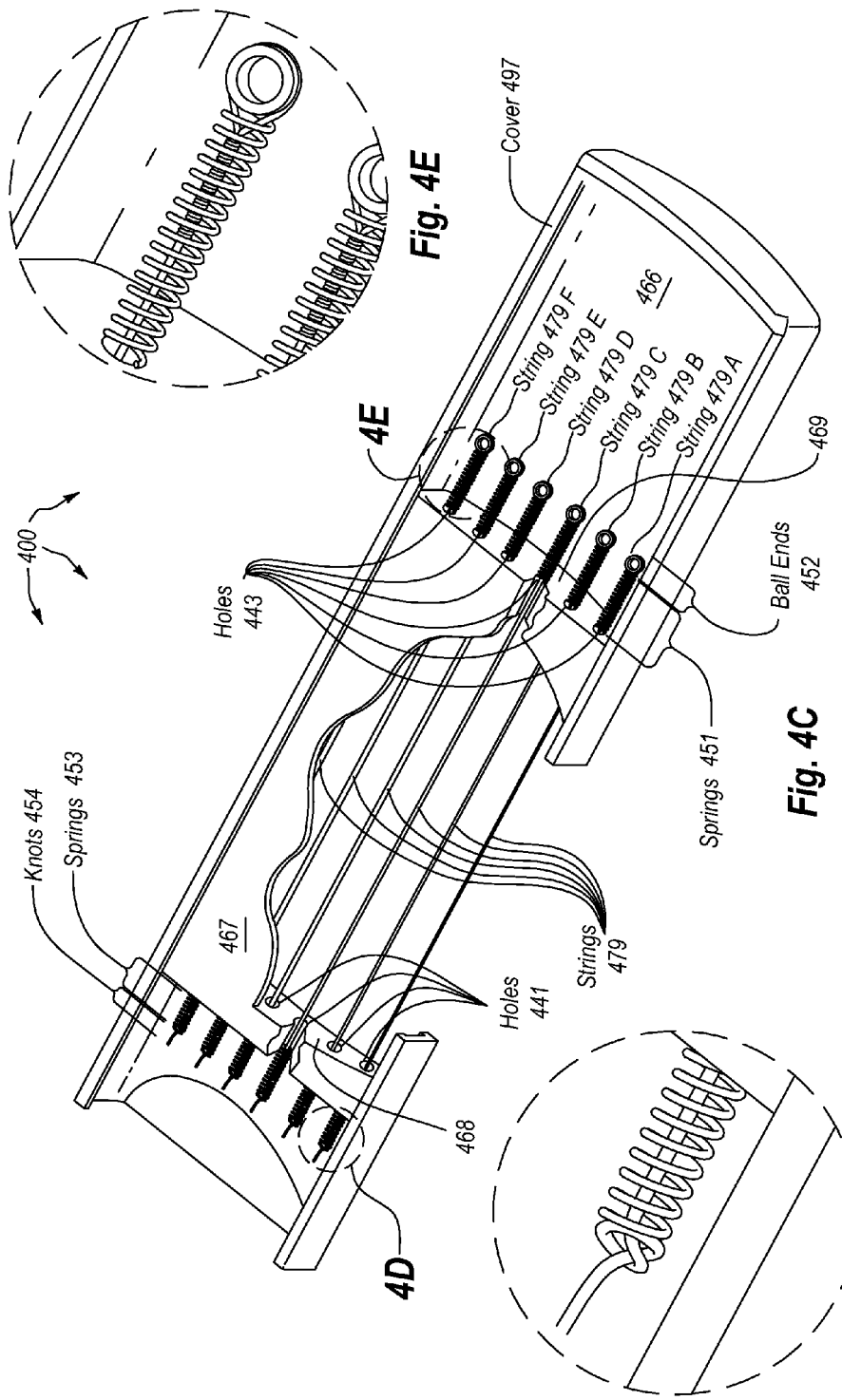

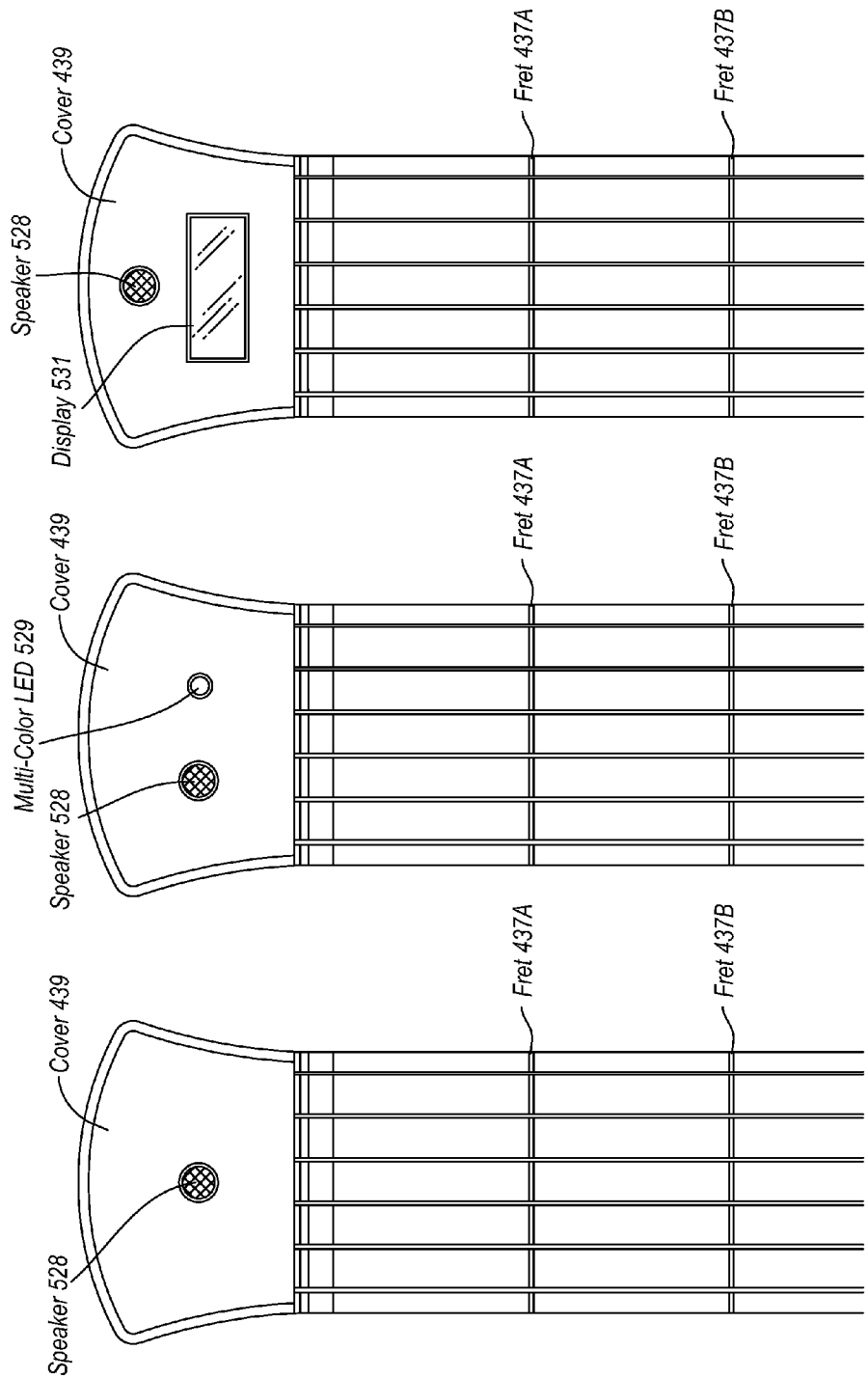

A-chords

B-chords

E-chords

F-chords

G-chords

STRINGED INSTRUMENT PRACTICE DEVICE AND SYSTEM

CROSS-REFERENCE TO RELATED APPLICATIONS

This application claims the benefit of U.S. Provisional Patent Application No. 61/587,262, entitled "Stringed Instrument Practice Device and System", filed Jan. 17, 2012, which is incorporated herein in its entirety.

BACKGROUND

Background and Relevant Art

Many stringed instruments (such as, guitars, bass-guitars, violins, violas, cellos, basses, double-basses, mandolins, ukuleles, banjos, etc.) necessitate that the player use his or her fingers to press the strings against a neck/fingerboard in order to produce different chords/notes. Unfortunately, learning the hand/finger positions necessary to make these chords/notes is often a difficult and arduous task for many students learning to play these instruments. Generally, students are simply required to practice these fingerings by "trial and error" until they become natural and memorized.

Due at least in part to the difficulties in learning these finger positions, devices have been designed to help students more readily recognize and learn these fingerings. However, many of these previously known practice devices are relatively large in size, difficult to use, are not portable/handheld, and do not accurately represent the "look and feel" of the actual instrument. For example, many practice devices have strings, contour, and/or fret spacing that differs from their corresponding stringed instrument.

Some practice devices, although smaller than an actual stringed instrument, are still relatively large. This larger size limits to some extent where the practices devices can be used. The required orientation of these practices devices for performing meaningful practice may also be less than ideal when compared to an actual stringed instrument. For example, some guitar practice devices can require the portion of the practice device used to modify string tension to be placed near a user's strumming hand during practicing.

Further, many practice devices fail to indicate when and/or where finger placement on a finger board or fret board is appropriate, for example, for making a chord. Many practice devices also fail to produce local sound so that a user can tell by ear if finger placement is appropriate.

BRIEF SUMMARY

The present invention extends to handheld devices for practicing to play stringed instruments, including various instruments in the chordophone family, such as, for example, electric guitars, acoustic guitars, violins, violas, cellos, basses, double-basses, mandolins, ukuleles, banjos, etc. More specifically, the present invention relates to a practice device that may assist a user in learning how to properly finger and play a stringed musical instrument.

Embodiments of the invention include a stringed instrument practice device. The stringed instrument practice device includes an elongate handle representing a neck portion of the string instrument. The elongate handle has a first end, second end, a first side, a second side, and a top portion. The top portion can include a plurality of frets representing a portion of a fret board. The elongate handle can be specifically configured for practicing a particular type of stringed instrument. For example, an elongate handle for practicing guitar can include a plurality of frets of a guitar neck. The frets can be spaced and sized as they would be on an actual guitar.

The stringed instrument practice device also includes a plurality of strings. For each of the plurality of strings, a first string holder at the first end and a second string holder at the second end secure the strings. The plurality of strings runs along the top portion between the first end of the elongate handle and the second end of the elongate handle. The number and arrangement of strings can be specifically configured for practicing a particular type of stringed instrument. For example, six strings can be strung on an appropriate elongate handle for practicing guitar. The strings can be spaced and tensioned as they would be on an actual guitar. Accordingly, a user can place an arrangement of one or more fingers on the strings of a practice device as a way of practicing placement of the arrangement of one or more fingers on the corresponding actual stringed instrument (e.g., to make a chord).

A recessed portion runs along the first side of the elongate handle. A slidable cover component has one or more guide members configured to slidably engage within the recessed portion that runs along the first side. The slidable cover component is slidable to cover or expose the plurality of strings.

The stringed instrument practice device can include one or more internal and/or external digital and/or electronic components. For example, the stringed instrument practice device can include sensors for detecting one or more of: finger positions and string to fret contact on the fret board. A comparison module can determine if the detected one or more of: the finger positions and string to fret contact form an appropriate musical note or musical chord. A visual indicator (e.g., an LED or display) can indicate if the detected one or more of: the finger positions and string to fret contact form an appropriate musical note or musical chord based on the determination.

In some embodiments, a second plurality of strings for strumming is secured to the slidable cover component. Each string in the second plurality of strings corresponds to a string in the first plurality of strings. One or more strum sensors (e.g., a pickup) are configured to detect when strings from among the plurality of strings are strummed. The stringed instrument practice device can also include an audio output device for outputting sound based on the detected one or more: finger positions and string to fret contacts and detected strings that are strummed.

In further embodiments, additional visual indication components, for example, LEDs, are embedded in the fret board. The LEDs can be illuminated to indicate where fingers are to be place on the fret board to form a musical note or musical chord.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIGS. 3B-3E illustrate different examples of stringed instrument practice devices with input sensing components.

FIGS. 3F-3H illustrate different examples of string instrument practice devices with display output components.

FIGS. 4A and 4B illustrate another example stringed instrument practice device.

FIGS. 4C-4E illustrate different portions of an example cover for a stringed instrument practice device.

FIGS. 5E-5G illustrate different examples of string instrument practice devices with display and sound output components.

DETAILED DESCRIPTION

The present invention extends to methods, systems, and computer program products for practicing to play stringed instruments, including various instruments in the chordophone family, such as, for example, electric guitars, acoustic guitars, violins, violas, cellos, basses, double-basses, mandolins, ukuleles, banjos, etc. More specifically, the present invention relates to an electronic practice device that may assist a user in learning how to properly finger and play a stringed musical instrument.

In general embodiments of the invention include electronic practice devices configured perform one or more of the following: detect when finger positions and/or string to fret contact on a finger or fret board forms an appropriate musical note or musical chord, visually indicate appropriate positions on a finger or fret board for forming a musical note or musical chord, and detecting when strings have been selected (e.g., strummed). Electronic practice devices can emit sound in the form of musical notes and chords. Electronic practice devices can include communication modules for communicating with other computing devices, including mobile phones and tablets. An electronic practice device can interact with applications on other computing devices to further assist users in learning how to play a stringed musical instrument.

Figure 1:
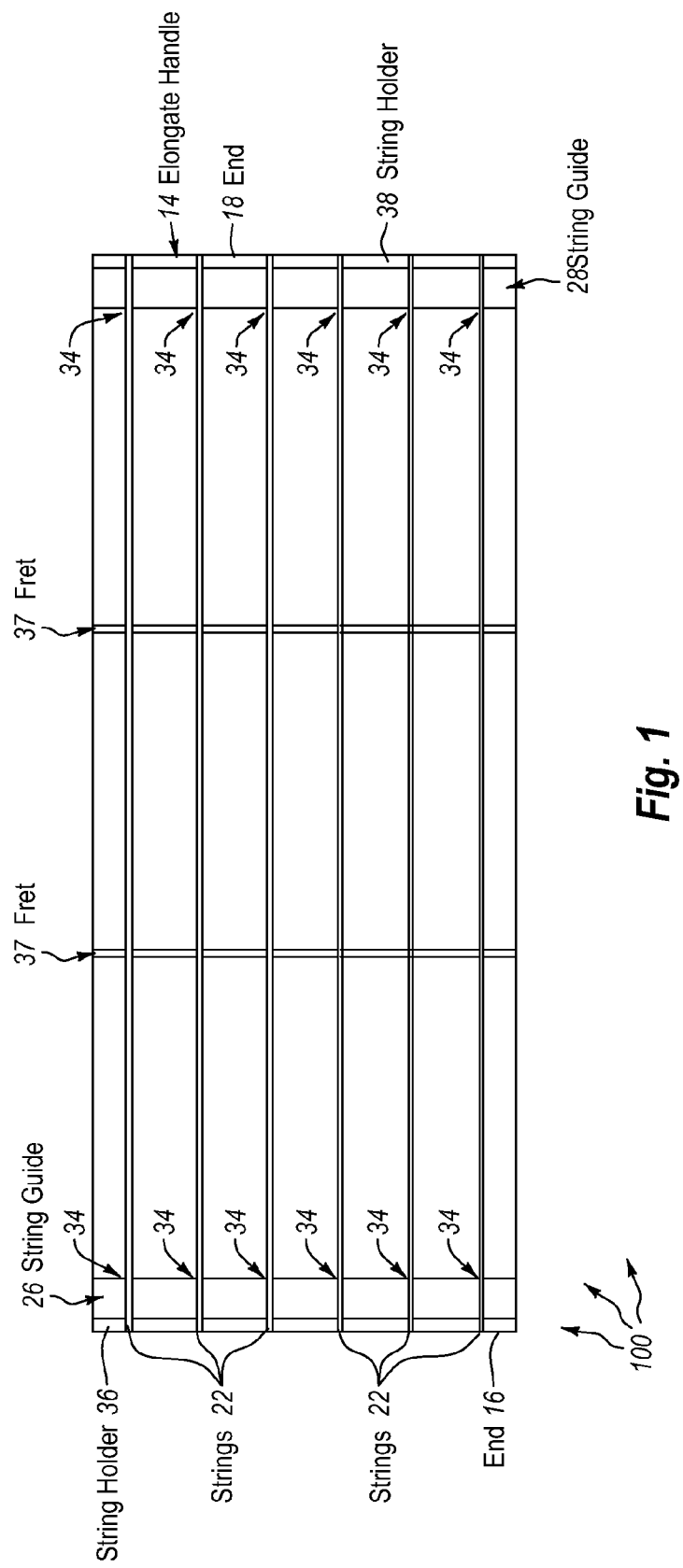
FIG. 1 illustrates an example stringed instrument practice device.

FIG. 1 illustrates an example stringed instrument practice device 100. Practice device 100 is configured to assist a user in learning the finger positions that are used to play a musical stringed instrument, such as, for example, a guitar. However, embodiments of the invention include stringed practice devices to assist the a user in learning how to play other types of stringed instruments including bass-guitars, violins, violas, cellos, basses, double basses, mandolins, ukuleles, banjos, etc.

As depicted, stringed instrument practice device 100 includes elongate handle 14 (including ends 16 and 18), strings 22, frets 37, string guides 26 and 28, and string holders 36 and 38. Generally, each different component of stringed instrument practice device 100 can be made of a different material or different materials, including plastics, metals, metal alloys, woods, glass, graphite, corian, nylon, fluorocarbons, animal products (including bone), plant products, as well as combinations of one or more of these materials. In some embodiments, different components of stringed instrument practice device 100 are made from similar (or even the same) materials used to make stringed instruments for which it is used for practice. For example, when stringed instrument practice device 100 is to be used to practice guitar, the components of stringed instrument practice device 100 can be constructed from materials used to make a guitar.

Elongate handle 14 can be configured similar to the neck or fingerboard of an actual stringed instrument, such as, for example, the neck of a guitar, bass, banjo, ukulele, or mandolin or the fingerboard of a violin, viola, cello, bass, double bass, etc. Elongate handle 14 is configured to be handheld. That is, the size and configuration of elongate handle 14 are for holding in a user's hand. However, it should be understood that this does not necessarily mean that the whole of elongate handle 14 fits entirely within the user's hand. For example, although a portion of elongate handle 14 is held within the user's hand, end 16 and/or end 18 can extend past the end of the user's hand when elongate handle 14 is held by a user.

The length of elongate handle 14 can vary depending on one or more of: the type of stringed instrument it represents, how much of the neck or fingerboard of a stringed instrument is required for meaningful practice (e.g., how many frets are used to form chords, scales, etc.), space requirements of a practice area, and desired level of portability. In some embodiments, elongate handle 14 is less than eleven inches in length. In other embodiments, elongate handle 14 is between seven and eight inches in length. In further embodiments, elongate handle 14 is sized and configured specifically for fitting in a pocket (e.g., a pants or shirt pocket).

In some embodiments, elongate handle 14 is a single component combining a neck portion along with a fingerboard or fret board on top of a neck portion. For example, a neck portion and topside fret board can be constructed from a single piece of wood or other material. Alternately, in other embodiments, a neck portion and fingerboard or fret board are independently constructed (possible from different materials) and then the fingerboard or fret board is secured (e.g., glued) onto the top of the neck portion. The neck portion can be constructed from wood, graphite, aluminum, carbon fiber, etc. The fingerboard or fret board can be constructed from wood, such as, for example, rosewood, ebony, maple, or from composite materials, such as, for example, high pressure laminate ("HPL") or resin.

In some embodiments, elongate handle 14 includes multiple sections that are connected to one another to form elongate handle 14. For example, elongate handle 14 can include two or more separate sections (each section constructed as a single component or including separately constructed components that were subsequently attached together) that are joined together to provide the full-sized elongate handle 14, for practicing purposes. The multiple sections of elongate handle 14 can be hingedly coupled together, permitting elongate handle 14 to fold into an even more compact configuration when stored, and unfolded into the depicted configured for use as a practicing device. Other mechanisms, such as, for example, a dowel pin and hole system, can also be used to join the multiple sections into elongate handle 14.

Stringed instrument practice device 100 can include a plurality of strings that are mechanically secured to elongate handle 14. As depicted in FIG. 1, strings 22 (six strings) are mechanically connected to elongate handle 14. Strings 22 are strung across the elongate handle 14 extending between end 16 and end 18. Strings 22 can be strings that are otherwise usable on an actual stringed instrument. Strings 22 can also be matched to the type of stringed instrument for which stringed instrument practice device 100 is to be used for practice. For example, strings 22 can be guitar strings when stringed instrument practice device 100 is a device configured for practicing guitar.

The use of appropriate strings enhances a user's practice experience. For example, using real instrument strings matched to a specific stringed instrument provides a more realistic experience to a user when they practice. The use of real instrument strings on stringed instrument practice device 100 also permits a user's finger tips to adjust to the feel/toughness of the instrument strings in preparation for playing a stringed instrument. Strings can constructed from animal products (e.g., used to make gut strings), plant products, polymer materials, such as, for example, nylon and fluorocarbon, metals, and metal alloys incorporating steel, nickel, or phosphor bronze. Strings can also be constructed from a combination of materials, such as, for example, a stranded synthetic core (e.g., Perlon or other nylon) wound with various metals or a (solid or stranded) steel core wound with various other metals. Strings can be roundwound, flatwound, halfwound, ground wound, pressure wound, etc.

As depicted, string guides 26 and 28 are used to space strings 22 from one another at ends 16 and 18 respectively. The strings can be pulled with sufficient tension such that string spacing provided by string guides 26 and 28 remains essentially the same along the length of elongate handle 14. String guides 26 and 28 can be made of plastic or other appropriate materials. String guides 26 and 28 include grooves 34 that align strings 22 in specified positions on elongate handle 14 and also prevent the strings from moving along the width of elongate handle 14. String guides 26 and/or 28 can be or represent a nut or saddle of an actual guitar. String guides can be constructed from bone, plastic, brass, corian, graphite, stainless steel, or other appropriate materials.

String holders 36 and 38 are used to mechanically secure strings 22 to elongate handle 14 at ends 16 and 18 respectively. Various mechanisms, such as, for example, glue, screws, clamps, etc., can be used to mechanically secure strings 22 to elongate handle 14. String holders 36 and 38 are used to maintain (and potentially adjust) tension in strings 22 and also prevent the strings from moving along the length of elongate handle 14. In some embodiments, string holders 36 and 38 are similar to a bridge.

As depicted, stringed instrument practice device 100 also includes a number of frets 37. Frets 37 are positioned along the handle 14 and are designed to guide the user in positioning their hands and/or fingertips (e.g., to form chords). Frets 37 can be added to embodiments that correspond to guitars or other stringed instruments that include frets. Frets can be constructed from (e.g., jumbo or medium) fret wire of various different heights. In some embodiments, fret wire is nickel alloy or stainless steel.

Stringed instrument practice device 100 can include essentially any number of frets 37. In some embodiments (e.g., as depicted in FIG. 1), stringed instrument practice device 100 includes a plurality of frets 37. The number of frets included in stringed instrument practice device 100 can be tailored for the application (e.g., type of practicing, such as, for example, chords, scales, etc.) in view of the overall length of stringed instrument practice device 100.

On a guitar, fewer frets may be used to practice chords than to practice scales. Thus, a version of stringed instrument practice device 100 for practicing chords can include fewer frets 37 (and thus can be shorter) than another version of stringed instrument practice device 100 for practicing scales (or practicing both scales and chords). For example, a version of stringed instrument practice device 100 for practicing chords can include three frets 37 (dividing elongate handle 14 into four segments). On the other hand, another version of stringed instrument practice device 100 for practicing chords can include five frets 37 (dividing elongate handle 14 into six segments). Other versions of stringed instrument practice device can have other different numbers of frets 37 (e.g., four frets, six frets, seven frets, etc.)

For embodiments corresponding to other stringed instruments (e.g., violin, cello, and the like), frets 37 can be omitted.

Detecting Fret Board Contacts

Figure 2A:
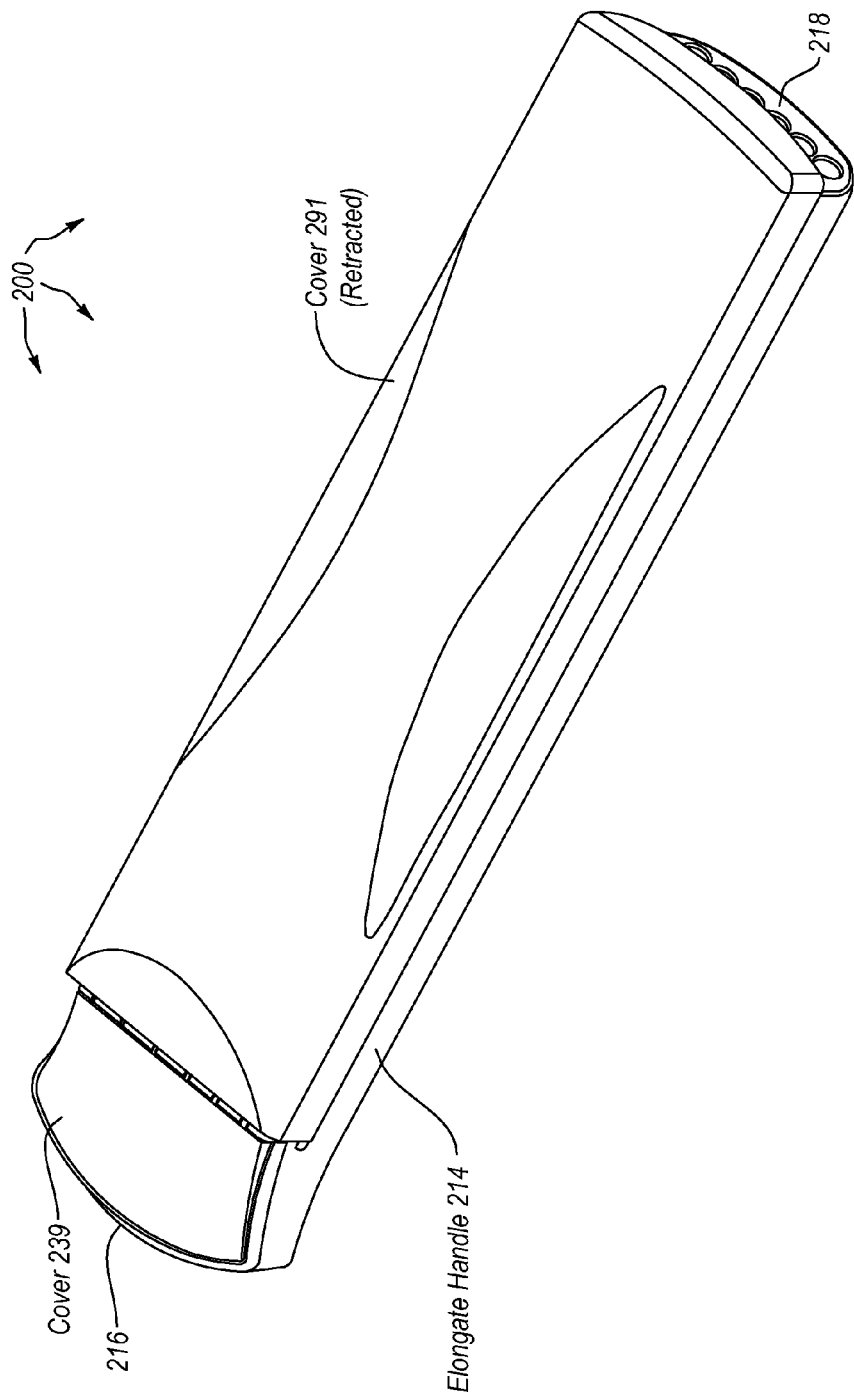
FIGS. 2A and 2B illustrate an example stringed instrument practice device.
Figure 2B:
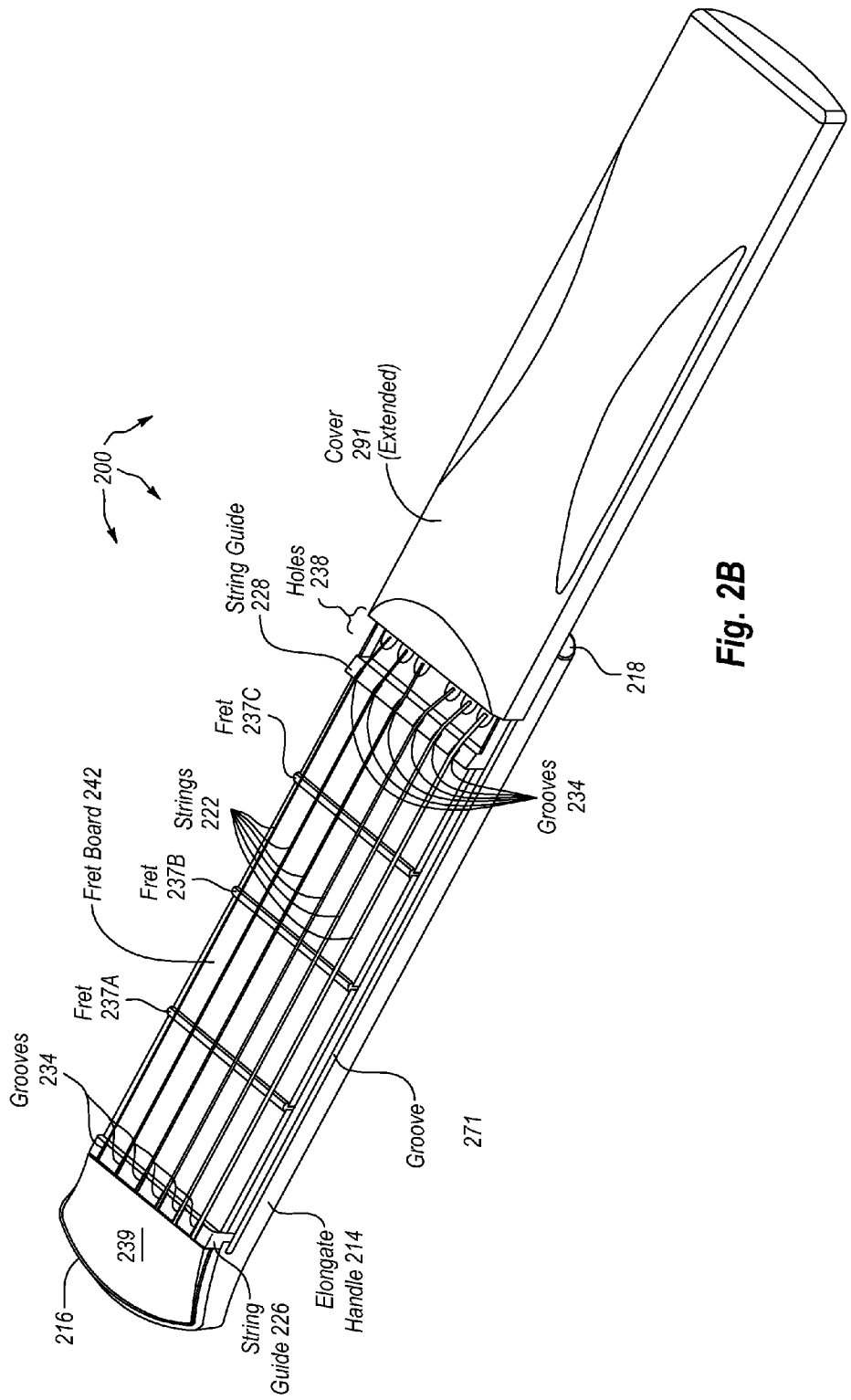

FIGS. 2A and 2B illustrate views of another example stringed instrument practice device 200. FIG. 2A depicts a view of the front side of stringed instrument practice device 200 (or the side of stringed instrument practice device 200 that faces away from a user when practicing). As depicted in FIG. 2A, stringed instrument practice device 200 includes elongate handle 214 (having ends 216 and 218), cover 239, and cover 291. Cover 291 is retracted to cover other components on the front side of stringed instrument practice device 200.

FIG. 2B depicts cover 291 extended towards end 218. When cover 291 is extended, other components on the front (top) side of stringed instrument practice device 200 are uncovered. As depicted in FIG. 2B, stringed instrument practice device 200 further includes fret board 242, frets 237A-237C (three frets), string guides 226 and 228, and holes 238. Elongate handle 214 can be constructed from various materials and combines a neck portion along with fret board 242 on top of the neck portion. Frets 237A-237C are similar to frets 37. String guides 226 and 228 are similar to string guides 26 and 28 and include grooves 234. Strings 222 are similar to strings 22. Each of strings 222 can also include a ball end, such as, for example, a brass or plastic ball, nut, or ferrule, affixed to one end of the string.

Elongate handle 214 also includes groove 271. Groove 271 runs essentially between just past string guide 226 and end 218 on the upside of elongate handle 214 (i.e., the side of elongate handle 214 that faces up when a user is practicing). Another similarly configured groove (not shown in FIG. 2B) can be included on the downside of elongate handle 214 (i.e., opposite of groove 271 or the side of elongate handle 214 that faces down when a user is practicing). Cover 291 can include guide members that extend into groove 271 and into the similarly configured groove on the downside of elongate handle 214. The guide members reduce the possibility of cover 291 disengaging from elongate handle 214 due to forces other than those moving cover 291 essentially parallel to the grooves (e.g., sliding cover 291 towards end 218).

A combination of tension plates and screws can be used to secure strings 222 internally within elongate handle 214 at end 218. Ball ends can be used to secure strings 222 at end 216.

Although string instrument practice device 200 is depicted with three frets, other numbers of frets, such as, for example, four frets, five frets, six frets, etc., can be used.

Various electrical and/or electronic components (digital and/or analog) can be included at and/or contained within elongate handle 214. Interoperation of these components can assist a user in practicing a stringed instrument. For example, interoperation of electrical and/or electronic components can generate user input based on a user's interactions with other components (e.g., fret board 242, frets 237A, 237B, and 237C, and strings 222) of elongate handle 214. Interoperation of electrical and/or electronic components can also generate and provide visual and/or audio output to a user (e.g., in response to generated user input).

Components can include processing units, memory, storage devices, resistors, Integrated Circuits ("ICs"), capacitors, inductors, transistors, diodes, LEDs, speakers, displays, Application-Specific integrated circuits ("ASIC"), programmable logic arrays ("PLA"), logic gates, adders, flip-flops, counters, registers, multiplexers, Digital Signal Processors, ("DSP"), Field-programmable gate arrays ("FPGA"), etc. Generally, stringed instrument practice device 200 can include sensors for detecting finger positions on fret board 242 and/or string to fret contact on fret board 242. Stringed instrument practice device can also include one or more output devices (e.g., LEDs, display, speakers, etc.) for presenting visual and/or audio output.

Figure 3A:
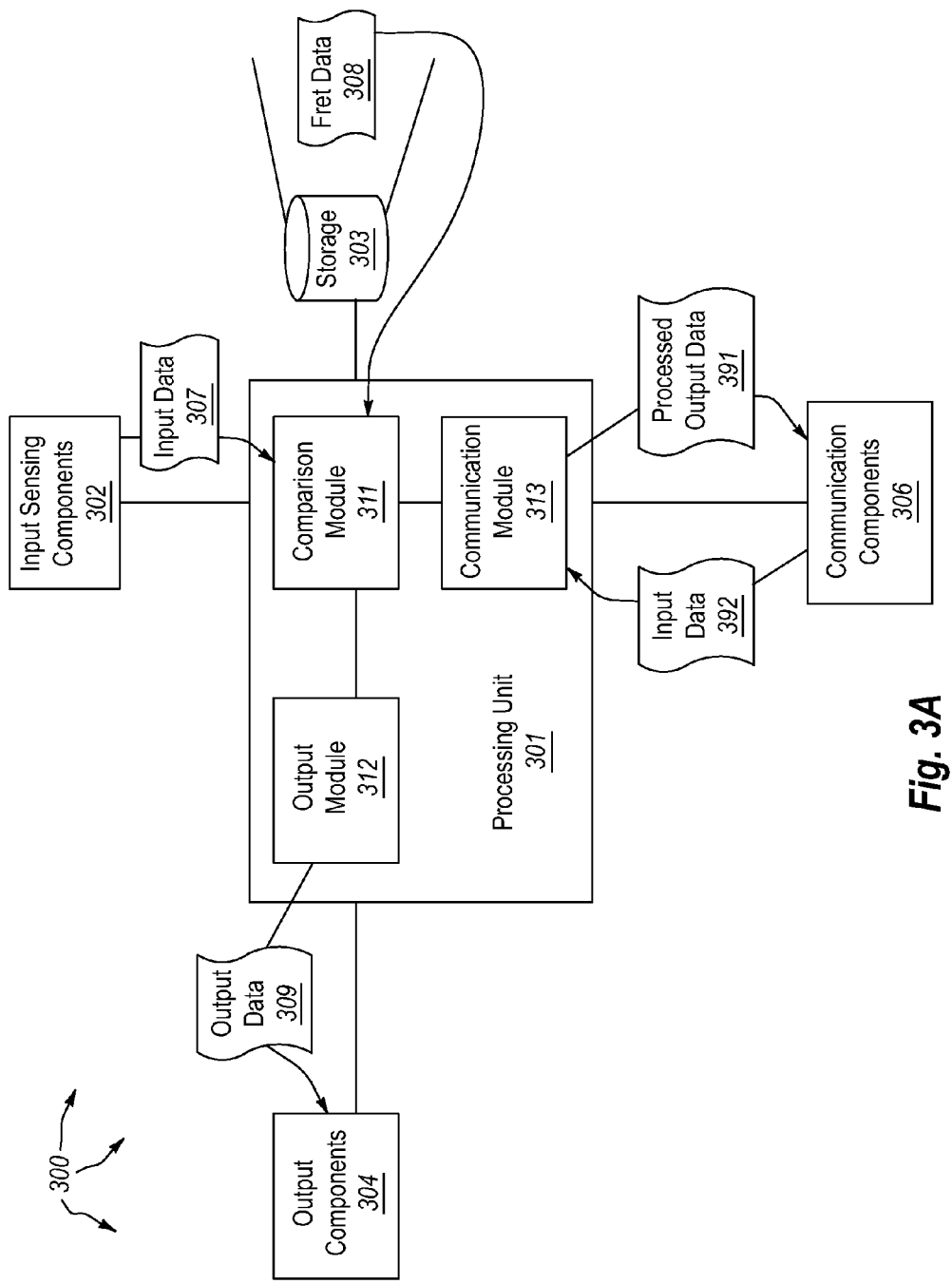
FIG. 3A illustrates an example architecture of components that can be included at and/or contained within a stringed instrument practice device.

FIG. 3A depicts example architecture 300 of components that can be included at and/or contained within elongate handle 214. As depicted, architecture 300 includes processing unit 301, input sensing components 302, storage 303, output components 304, and communication components 306. Processing unit 301 further includes comparison module 311, output module 312, and communication module 313. Processing unit 301, input sensing components 302, storage 303, output components 304, and communication components 306 can be included at and/or contained within elongate handle 214.

Storage 303 stores fret data 308. Fret data 308 can include chord data, scale data, etc. that indicates finger positions and/or fret to string contact locations for known musical chords, scales, etc.

Chord data for virtually any type of chord can be included in fret data 308. For example, fret data 308 can include, but is not limited to, finger position data and/or string to fret contact data indicating major chords, minor chords, sharp chords, dominant seventh chords, sixth chords, suspended chords, slash chords, diminished chords, augmented chords, bar chords, etc., as well as combinations thereof. At least some chords can be selected using a variety of different finger position combinations and/or string to fret contact combinations. As such, fret data 308 can include multiple different finger position combinations and/or string to fret contact combinations for a chord. There are approximately 64 different possible inputs per fret, 63 different finger placement and/or string to fret contact combinations (6 combinations of a one string selected+15 combinations of two strings selected together+20 of three strings together+15 combinations of four strings selected together+6 combinations of 5 strings selected together+1 combination of six strings selected together) and an open fret. Per fret, fret data 308 can account for each of the different finger placement combinations and an open fret.

Scale data for virtually any type of scale patterns, progressions, etc., can be included in fret data 308. For example, fret data 308 can include, but is not limited to, finger position data and/or string to fret contact data indicating at least portions of: major scales, minor scales (natural, harmonic, melodic), pentatonic scales, blues scales, whole tone scales, diminished scales, etc., as well as combinations thereof, such as, for example, the first few progressions of the A Minor Pentatonic scale (appropriate for the number of frets on stringed instrument practice device 200).

Input sensing components 302 can be used to sense finger locations on fret board 242 and/or string to fret contact on fret board 242. Input sensing components 302 can formulate input data 307 and send input data 307 to comparison module 311.

Upon receiving input data 307, comparison module 311 can compare input data 307 to fret data 308 to determine if input data 307 indicates a known chord or portion of a scale progression. For example, comparison algorithm 311 can detect finger placement position and/or string to fret contact per fret and compare detected finger placement position and/or string to fret contact per fret to fret data 308. Per fret, comparison module 311 can compare finger placement position and/or string to fret contact to fret data 308 to identify a chord. For example, if finger positions and/or fret to string contacts indicate any of the finger placements for an A major chord, the A major chord can be identified.

When comparing input data 307 to fret data 308 for a scale progression, comparison module 111 can buffer (e.g., in system memory or in storage 303) previously received input data to account for timing of input. That is, since finger positions and/or string to fret contacts of a scale progression are received subsequent to one another (and thus at different times) comparison module 111 can retain prior input data for comparison to determine if notes are received in the appropriate order.

Output module 312 can output the results of any comparisons to output components 304. Output components 304 can present output data 309.

Communication module 313 can formulate processed data 391 (e.g. digital data) indicating results any comparisons at comparison module 311. Communication module 313 can communicate processed data 391 to other computing devices (e.g., a mobile phone, tablet, computer system, etc.) through communication components 306. Communication components 306 can include components for wireless (e.g. Infrared, Bluetooth or WiFi) and/or wired (e.g., USB or Ethernet) communication. Communication module 313 can also receive input data 392 (e.g., instructions, diagnostics, software updates, etc.) from other computing devices through communication components 306.

Results from comparison module 311 can indicate if a chord was formed, if a scale was completed, what chord was formed, what scale was completed, what finger positions and/or string to fret contacts were detected, what finger positions and/or string to fret contacts are likely to be incorrect, what the correct finger positions and/or string to fret contacts are, etc.

Figure 3B:
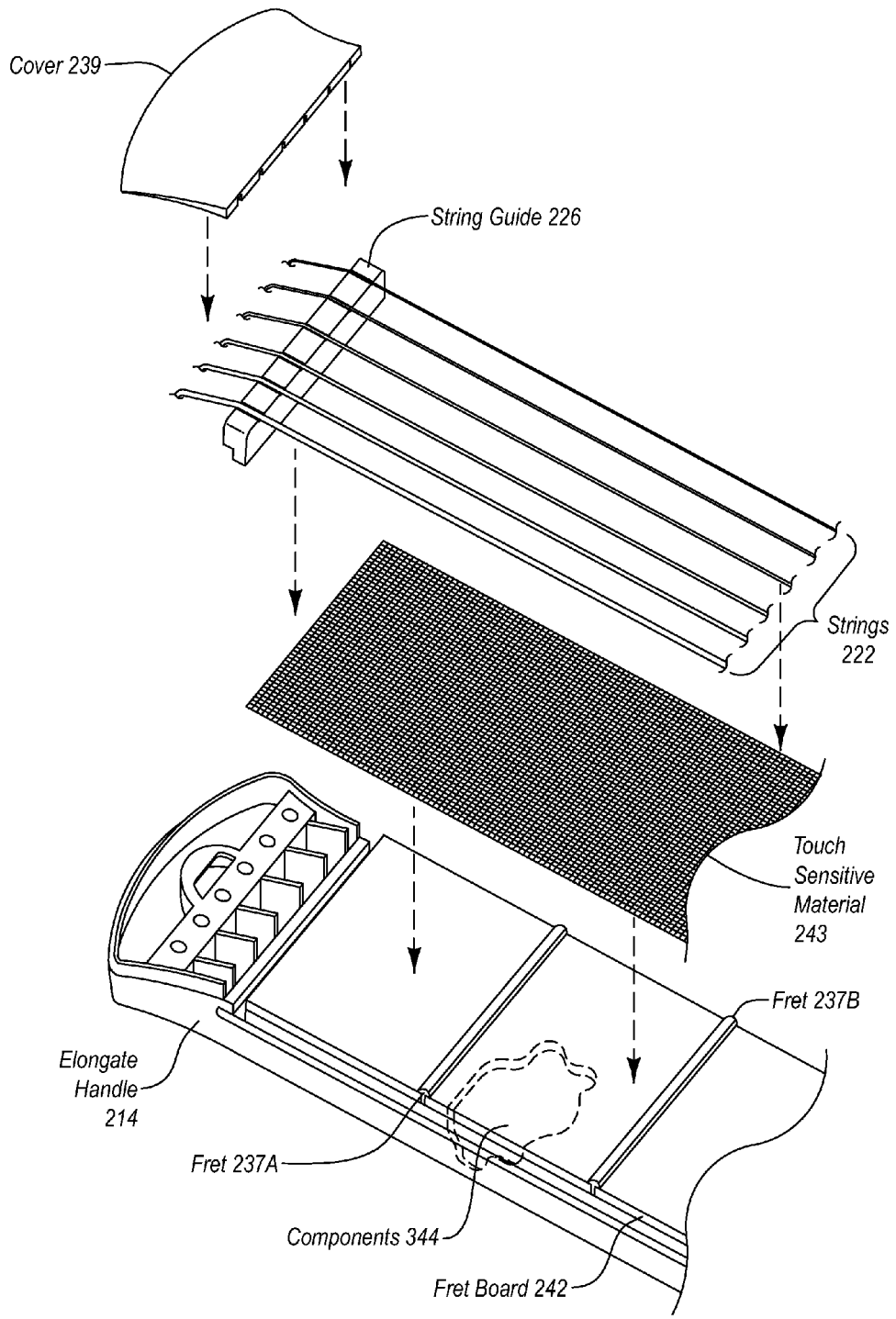

In some embodiments, input sensing components 302 include a touch or pressure sensitive material. For example, as depicted in FIG. 3B a layer of touch sensitive material 243 can be positioned over the top of fret board 242. String guide 226 and strings 222 can then place on top of touch sensitive material 243. Any of a variety of different touch sensitive materials including: resistive, surface acoustic wave, capacitive (surface, projected, mutual), infrared, optical, dispersive signal technology, and acoustic pulse recognition, can be used. Outputs from touch sensitive material 243 can connect to components 344 contained within elongate handle 214, such as, for example, components from one or more of FIGS. 3A, 5A, and 9A.

As depicted in FIG. 3C, sensor matrix 358 is placed on top of fret board 242. String 222A-222F are then attached to elongate handle 214. In some embodiments, each of strings 222A-222F correspond with and can be referred to as a musical note. For example, strings 222A-222F can correspond with and be referred to as musical notes of a guitar. String 222A (furthest away during use) can correspond to a musical note "E". String 222B can correspond to a musical note "B". String 222C can correspond to a musical note "G". String 222D can correspond to a musical note "D". String 222E can correspond to a musical note "A". String 222F (closest during use) can correspond to a musical note "E" (often referred to as low E).

Sensor matrix 358 can include a sheet of horizontal contacts and a sheet of vertical contacts. When the sheets are placed together sensor matrix 358 is created. Each intersection of a horizontal and vertical contact is a sensing element 359. Pressure on top of a sensing element (e.g., a finger pressing down a string or a string pressing down on a fret) causes the horizontal and vertical contacts to touch, changing the electrical properties of the matrix in a way that the pressure can be detected. In some embodiments, sensor matrix 358 is between 0.1 mm and 0.3 mm thick.

A combination of finger locations and string to fret contact locations detected by sensor matrix 358 can be used to generate touch locations 361 (an example of input data 307). Touch locations 361 can be sent to processing unit 301 for comparison to fret data 308.

Figure 3D:
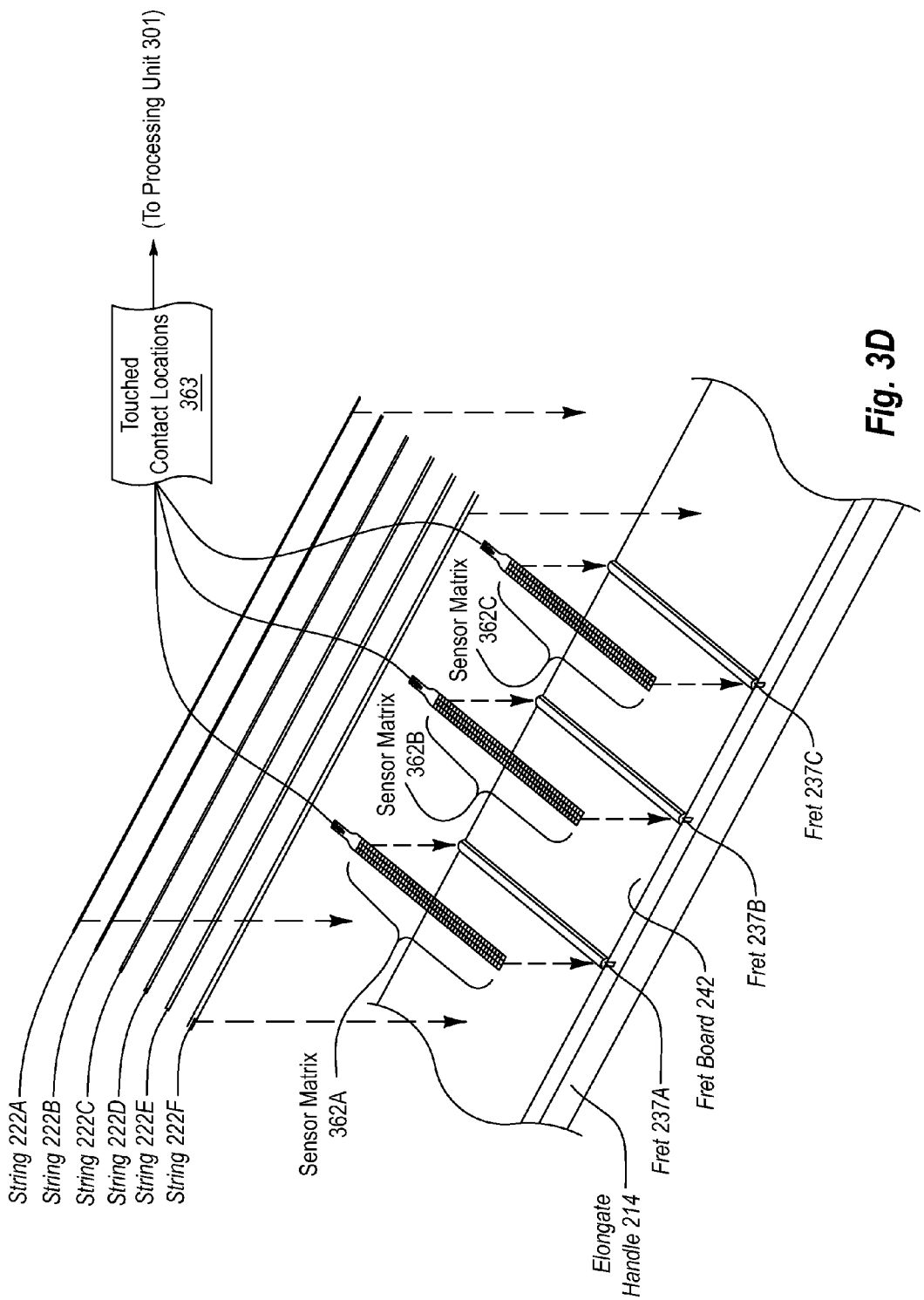

As depicted in FIG. 3D, sensor matrices 362A, 362B, and 362C are placed over frets 237A, 237B, and 237C respectively. Strings 222A-222F are then attached to elongate handle 214. Each of sensor matrices 362A, 362B, and 362C can include sensing elements similar to sensor matrix 358. A combination of string to fret contacts and/or finger locations detected by sensor matrices 362A, 362B, and 362C can be used to generate touch locations 363 (an example of input data 307). Touch locations 363 can be sent to processing unit 301 for comparison to fret data 308. In some embodiments, each sensor matrices 362A, 362B, and 362C are between 0.1 mm and 0.3 mm thick.

In some embodiments, the width of sensor matrices 362A, 362B, and 362C and the width of the fret wire used for frets 237A, 237B, and 237C are essentially the same width.

In other embodiments, sensor matrices 362A, 362B, and 362C are somewhat wider than the width of the fret wire used for frets 237A, 237B, and 237. In these other embodiments, the extra width of sensor matrices 362A, 362B, and 362C can be used to determine if a string is appropriately or inappropriately pressing on a fret. For example, the extended width can be used to determine how close a finger is to a fret or if a finger is touching a fret (and is possibly in an inappropriate location). The extra width can also be used to determine if a string is pressing on a fret due to pressure applied to the string on top of the fret (and is possibly in an inappropriate location) or if a string is pressing on a fret due to pressure applied to the string on the fret board. As such, the likelihood of detecting an inappropriate finger location is increased.

Figure 3E:
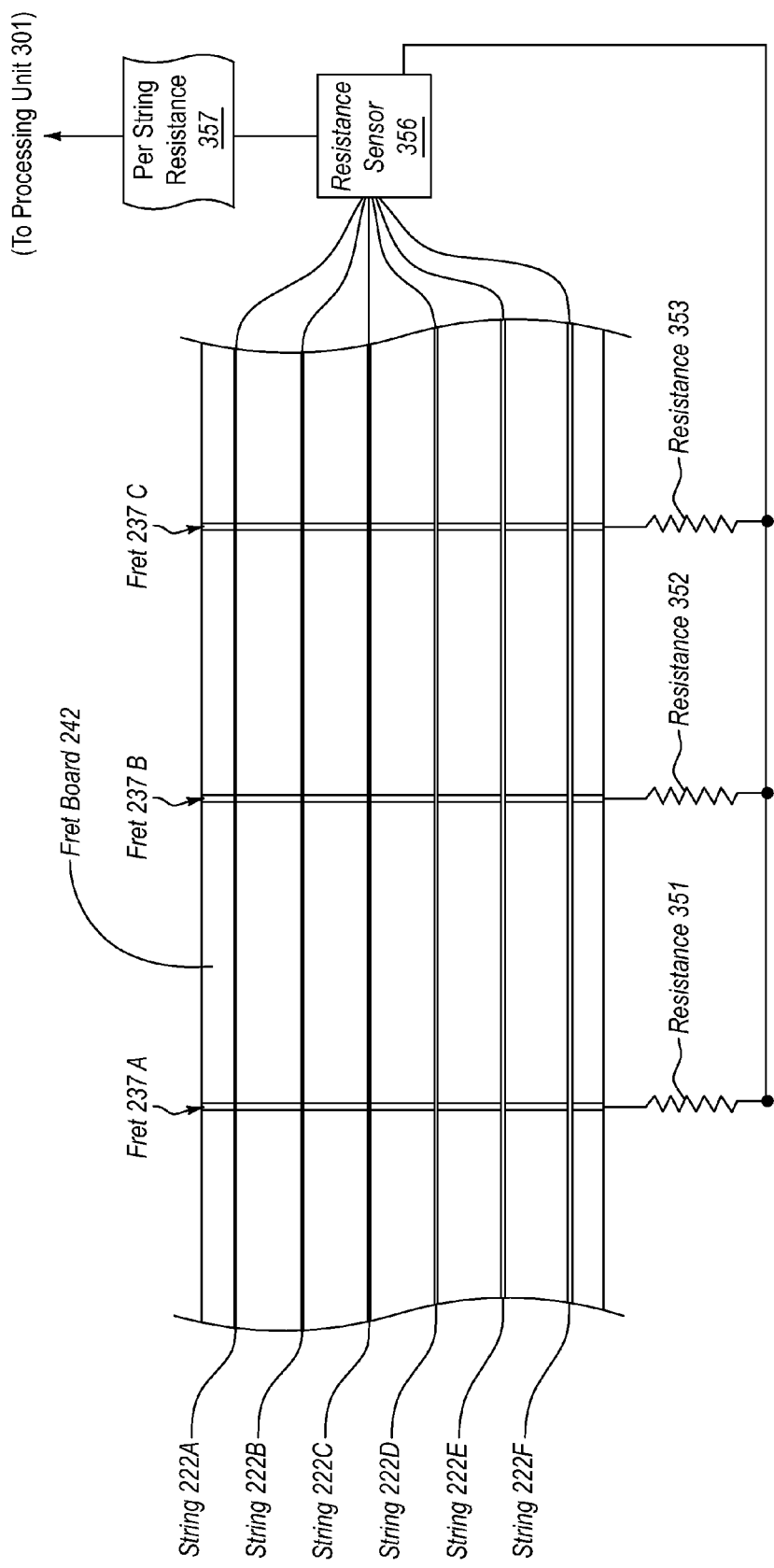

In some embodiments, input sensing components include electrical components used to vary electrical or magnetic properties (e.g., one or more of impedance [resistance and/or reactance], admittance [conductance and/or susceptance], capacitance, inductance, reluctance, voltage, current) of circuits (which may include strings and/or frets) in response to contact with one another and/or in response to human contact. For example, as depicted in FIG. 3E, resistances 351, 352, and 353 are connected to frets 237A, 237B, and 237C respectively. Resistances 351, 352, and 353 are also connected to resistance sensor 356 (an example of an input sensing component 302). Each of strings 222A-222F is also connected to resistance sensor 356.

Resistances 351, 352, and 353 can be different values. When a string is pressed down on a fret electrical contact is closed between the sides of resistance sensor 356 for the string. For example, when string 222F presses against fret 237 electrical contact is made between both sides of resistance sensor 356. Resistance sensor 356 can detect resistance 351 (plus any resistance in string 222F and fret 237A) for string 222F.

When a string is pressed down between a first fret and a second fret, the string may contact each of the first and second frets. For example, when string 222A is pressed between fret 237A and fret 237B, string 222A can touch each of frets 237A and fret 237B. As such, resistance sensor 356 can sense [(resistance 351*resistance 352)/(resistance 351+resistance 352)] (plus any resistance in string 222A and frets 237A and 237B) for string 222A.

At specified time intervals, resistance sensor 356 can formulate per string resistance 357 (an example of input data 307). Per string resistance 357 can be sent to processing unit 301 for comparison to fret data 308. In these embodiments, fret data 308 can include resistance values indicative of string to fret contact for frets 237A, 237B, and 237C based on resistances 351, 352, and 353. The resistance values can account for fret wire resistance and string resistance. The resistance values can also account for differences in string resistance to due string compositions and diameters.

In other embodiments, proximity sensors (e.g., touch switches) can be used to detect the presence of fingers near (or on a string) and/or a string near (or on a fret). In general, a proximity sensor (an example of an input sensing component 302) can emit an electromagnetic or a beam of electromagnetic radiation (infrared, for instance), and looks for changes in the field or return signal. The object being sensed can referred to as the proximity sensor's target. Different sensors can be used for different proximity sensor targets. For example, a capacitive or photoelectric sensor can used for a plastic target; an inductive proximity sensor can be used for a metal target.

In some embodiments, fret data 308 can be used to identify any of the chords in FIGS. 11A-11G (including any alternative ways of forming the chords).

Returning back to FIG. 3A, output module 312 can send output data 309 to output components 304. Output components 304 can include visual output components. Turning now to FIG. 3F, output components 304 can include multi-color LED 371. Output data 309 can contain data that changes the color of multi-color LED 371 based on the results of comparisons performed by comparison module 311.

For example, if a comparison indicates that finger positions and/or string to fret contacts were appropriate (e.g., formed a valid chord, formed part of a scale progression, etc.) output data 309 can contain data to change the color of multi-color LED 371 green. On the other hand, if a comparison indicates that finger positions and/or string to fret contacts were inappropriate for some reason (wrong positions, finger to fret contact, finger pressure on top of a fret, etc) output data 309 can contain data to change the color of multi-color LED 371 red. In some embodiments, specified colors (red, yellow, blue, etc) can be used to indicate specific types of events, such as, for example, appropriate string to fret contact and/or correct finger positions, inappropriate string to fret contact and/or wrong finger positions, etc.

Turning now to FIG. 3G, output components 304 can include display 372. Output data 309 can contain data for displaying messages on display 372 based on the results of comparisons performed by comparison module 311. Display 372 can be capable of displaying text and/or graphics in color and/or black and white. Displayed messages can indicate a chord or scale properly selected. For example, when a G chord is properly selected on fret board 242, output data 309 can contain data for displaying a "G" at display 372. Displayed messages can provide hints as to why a chord or scale was not properly selected, other instructional messages, or encouragement. For example, when a chord is not properly selected but moving a finger would result in proper selection of a chord, output data 309 can contain data for displaying a message to indicate a finger move, "move A string finger one fret towards the nut". Other messages can also be displayed, such as, for example, "finger is on top of fret", "finger is touching fret", "B string finger is not correct", "keep trying!!", etc. Message data for these and other types of messages can be stored in storage 303.

Turning to FIG. 3H, multi-color LED 371 and display 372 can be used in combination. In these embodiments, output data 309 can contain data for displaying messages on display 372 as well as data that changes the color of multi-color LED 371 based on the results of comparisons performed by comparison module 311.

Detecting Strummed Strings

Figure 4A:
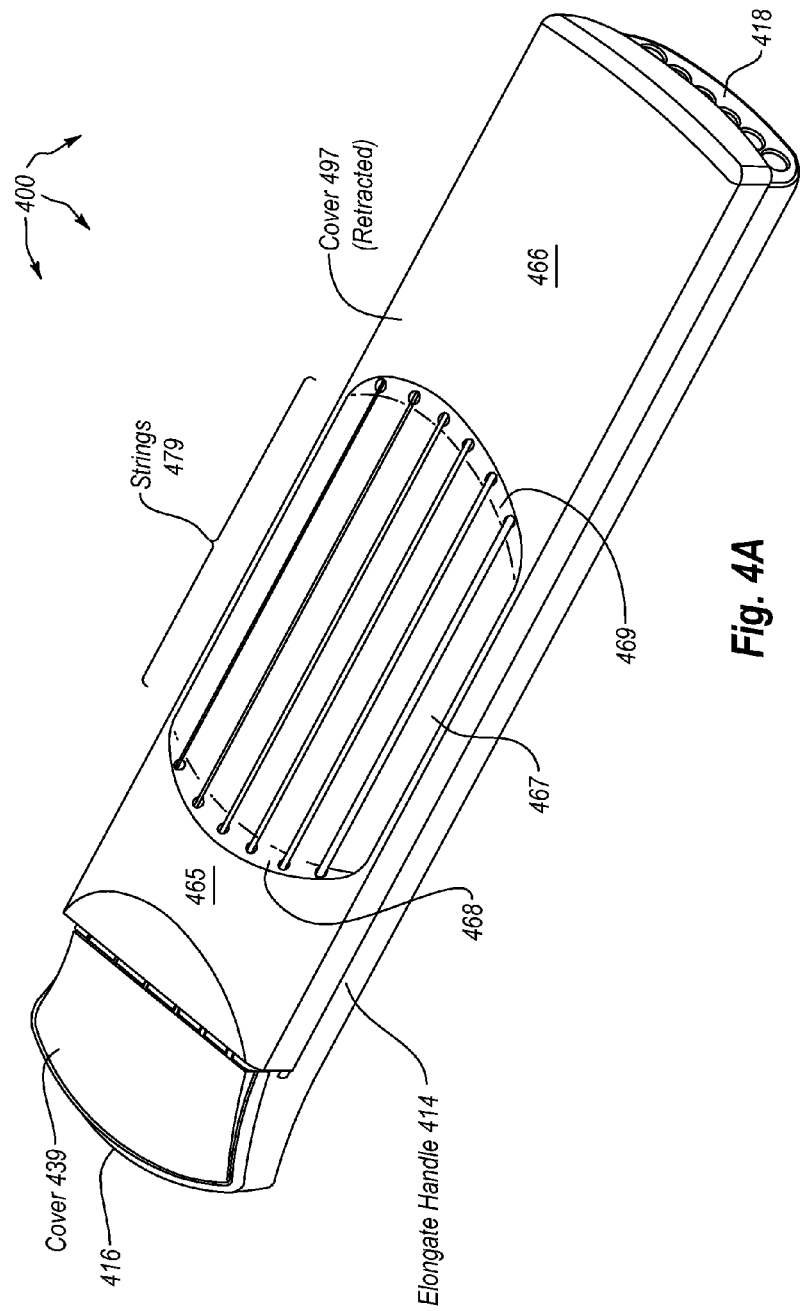

FIGS. 4A and 4B illustrate views of another example stringed instrument practice device 400. FIG. 4A depicts a view of the front side of stringed instrument practice device 400 (or the side of stringed instrument practice device 400 that faces away from a user when practicing). As depicted in FIG. 4A, stringed instrument practice device 400 includes elongate handle 414 (having ends 416 and 418), cover 429, and cover 497. Cover 497 includes strings 479. Cover 497 is retracted to cover other components on the front side of stringed instrument practice device 400 (including strings 422 in FIG. 4B). As further depicted, cover 497 includes portions 465, 466, 467, 468, and 469 and strings 479.

FIG. 4B depicts cover 497 extended towards end 418. When cover 497 is extended, other components on the front (top) side of stringed instrument practice device 400 are uncovered. As depicted in FIG. 4B, stringed instrument practice device 400 further includes strings 422A-422F, frets 437A-437C (three frets), string guide 428, and holes 438. Elongate handle 414 can be constructed from various materials and combines a neck portion along with a fret board on top of the neck portion.

Strings 422A-422F are then attached to elongate handle 414. In some embodiments, each of strings 422A-422F correspond with and can be referred to a musical note. For example, strings 422A-422F can correspond with and be referred to as musical notes of a guitar. String 422A (furthest away during use) can correspond to a musical note "E". String 422B can correspond to a musical note "B". String 422C can correspond to a musical note "G". String 422D can correspond to a musical note "D". String 422E can correspond to a musical note "A". String 422F (closest during use) can correspond to a musical note "E" (often referred to as low E).

The height of portion 467 can be lower relative to portions 465 and 466. Strings 479 are included within portion 467. Strings 479 can be configured with a size, height, and spacing similar to strings 422. For example, the spacing between individual strings of strings 479 can be essentially the same as the spacing between individual strings of strings 422. In some embodiments, the height of strings 479 are lower relatively to portions 465 and 466 of cover 497. This reduces the likelihood of strings 479 catching on external objects.

Elongate handle 414 also includes groove 471. Groove 471 runs essentially between just past string guide 426 and end 418 on the upside of elongate handle 414 (i.e., the side of elongate handle 414 that faces up when a user is practicing). Another similarly configured groove (not shown in FIG. 4B) can be included on the downside of elongate handle 414 (i.e., opposite of groove 471 or the side of elongate handle 414 that faces down when a user is practicing).

Cover 497 can include guide members that extend into groove 471 and into the similarly configured groove on the downside of elongate handle 414. The guide members reduce the possibility of cover 497 disengaging from elongate handle 414 due to forces other than those moving cover 497 essentially parallel to the grooves (e.g., sliding cover 497 towards end 418).

When cover 497 is extended, strings 479 can be positioned such that a user of stringed instrument practice device 400 can strum strings 479 (e.g., to simulate strumming the strings of a guitar, bass, banjo, etc.).

In some embodiments, cover 497 is a single (e.g., molded or extruded) plastic piece. Strings 479 can be attached to cover 497 separately.

FIG. 4C depicts cover 497 turned over (relative to FIGS. 4A and 4B) and fully disengaged from elongate handle 414. As depicted in FIG. 4C, part of portion 467 is cut away. Portion 468 further includes holes 441. Portion 469 further includes holes 443. Strings 479 pass through holes 441 and pass through holes 443

As depicted in FIG. 4C, each of strings 479 (strings 479A-479F) has a ball end 452 on one end and is tied in a knot on the other end. Springs 451 and 453 can maintain some amount of tension on strings 479 and can compensate for natural loss of tension in strings 479 during use. Each of strings 479A-479F can also correspond with and can be referred to a musical note. For example, strings 479A-479F can correspond with and be referred to as musical notes of a guitar (and can match strings 422A-422F respectively). String 479A (furthest away during use) can correspond to a musical note "E". String 479B can correspond to a musical note "B". String 479C can correspond to a musical note "G". String 479D can correspond to a musical note "D". String 479E can correspond to a musical note "A". String 479F (closest during use) can correspond to a musical note "E" (often referred to as low E).

To attach a string 479 to cover 497, the string 479 can be drawn through a corresponding spring 451 and then through a corresponding hole 443. The string 479 can then be drawn through a corresponding hole 441 and then through a corresponding spring 453. After being drawn through spring 453, the string 479 can be tied into a knot 454. Knots 454 can be of a size larger than the diameter of springs 453. Ball ends 452 can also be of a size large than the diameter of springs 451. Accordingly, the springs 451 and 452 push back against ball ends 452 and knots 454 respectively to keep tension on strings 479.

In alternate embodiments, strings 479 do not include ball ends 452. Instead, strings 479 are tied in a knot on both ends. The knots replacing ball ends 452 can be of a size larger than the diameter of springs 451.

FIGS. 4D and 4E depict closer views of knots and ball ends respectively.

Although string instrument practice device 400 is depicted with three frets, other numbers of frets, such as, for example, four frets, five frets, six frets, etc., can be used.

Figure 5A:
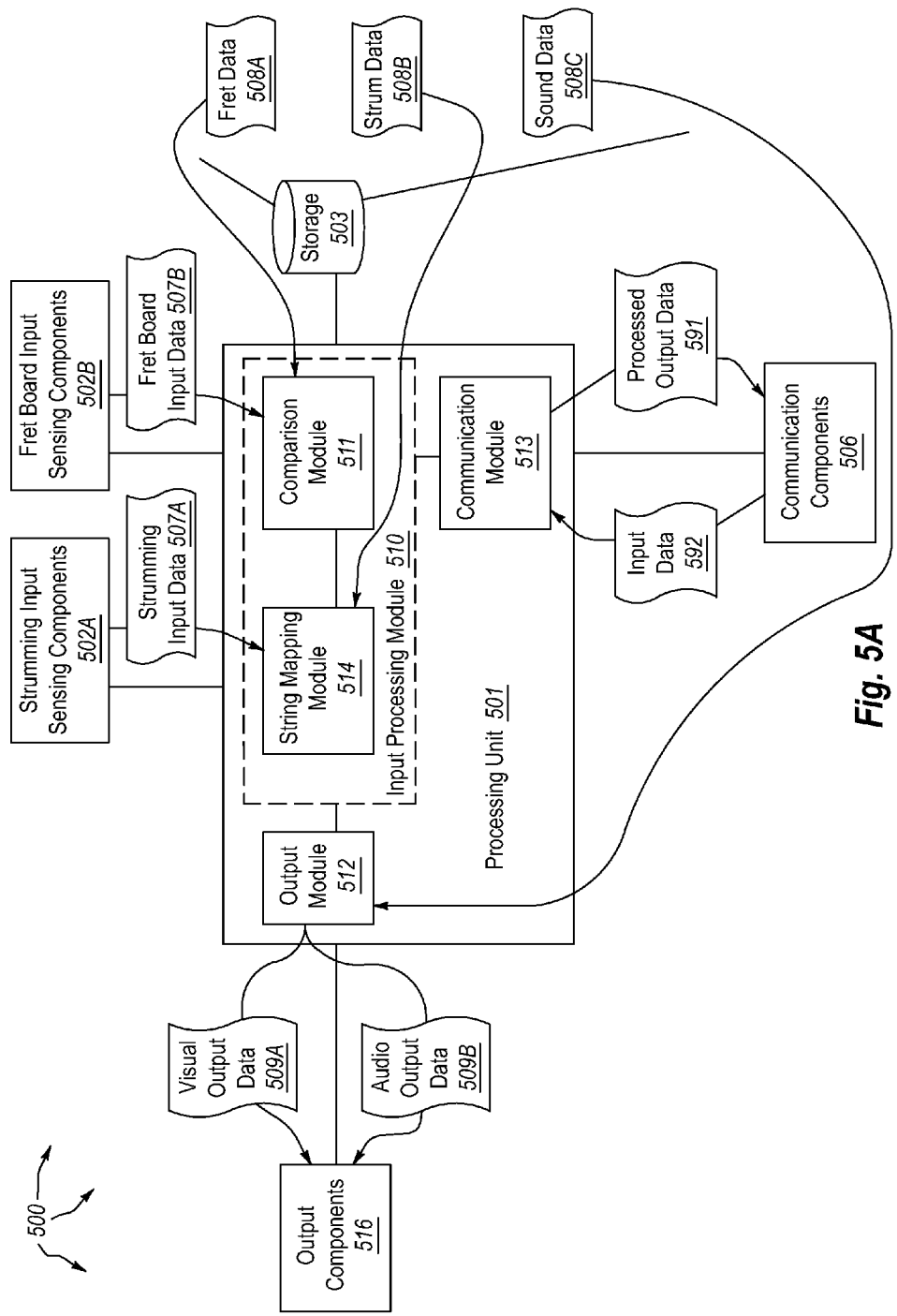
FIG. 5A illustrates an example architecture of components that can be included at and/or contained within a stringed instrument practice device.

FIG. 5A depicts example architecture 500 of components that can be included at and/or contained within elongate handle 414. As depicted, architecture 500 includes processing unit 501, strumming input sensing components 502A, fret board input sensing components 502B, storage 503, output components 516, and communication components 506. Processing unit 501 further includes input processing module 510, output module 512, and communication module 513. Processing unit 501, strumming input sensing components 502A, fret board input sensing components 502B, storage 503, output components 516, and communication components 506 can be included at and/or contained within elongate handle 414.

Storage 503 stores fret data 508A, strum data 508B, and sound data 508C. Similar to fret data 308, fret data 508A can include chord data, scale data, etc. that indicates finger positions and/or fret to string contact locations for known musical chords, scales, etc.

Strum data 508B can include data for determining what strings that have been strummed. On string instrument practice device 400, there are approximately 63 different possible inputs that can be strummed together (6 combinations of a one string+15 combinations of two strings+20 of three strings+15 combinations of four strings+6 combinations of 5 strings+1 combination of six strings). Strum data 508B can account for each of the different strumming combinations.

Sound data 508C can include data (e.g., in one or more Musical Instrument Digital Interface ("MIDI") compatible file formats) that can be used to generate audio output data. For example, sound data 508C can store information on what note to play and when, pitch and timbre blending information, loudness, vibrato, velocity, panning, cues, clock signals, etc. Sound data 508C can be used to complete a signal chain and produce audible sound. Processing unit 501 can also implement appropriate MIDI algorithms to convert sound data 508C into audio output data (or MIDI messages). For example, processing unit 501 can have a MIDI synthesizer built in.

In some embodiments, sound data 508C can be used to produce sound corresponding to any of the chords in FIGS. 11A-11G.

Generally, input processing module 510 can receive data from input sensors and determine what sounds to output from sound data 508C. Input processing module 510 can include modules for processing any of a variety of different types of input, such as, for example, digital or analog signals, electrical characteristic values (resistance, capacitance, inductance), mechanical system data (vibration data). etc., In some embodiments, input processing module more specifically includes string mapping module 514 and comparison module 511.

Strumming input sensing components 502A can be used to sense when any of strings 479A-479F (of combinations thereof) are strummed Strumming input sensing components 502A can formulate strumming input data 507A and send strumming input data 507A to string mapping module 514. String mapping module 514 can refer to strum data 508B to determine, based on strumming input data 507A, if any strings have been strummed and, if so, what combination of strings 479A-479F that have been strummed.

Fret board input sensing components 502B can be similar to input sensing components 302 (e.g., touch sensitive material or an electric circuit components) and can be used to sense finger locations on fret board 442 and/or string to fret contact on fret board 442. Input sensing components 502B can formulate fret board input data 507B and send fret board input data 507B to comparison module 511.

Upon receiving fret board input data 507B, comparison module 511 can compare fret board input data 507B to fret data 508A to determine if input data 507B indicates a known chord or portion of a scale progression. For example, comparison algorithm 511 can detect finger placement position and/or string to fret contact per fret and compare detected finger placement position and/or string to fret contact per fret to fret data 508A. Per fret, comparison of finger placement position and/or string to fret contact to fret data 508A can be used to identify a chord. For example, if finger positions and/or fret to string contacts indicate any of the finger placements for a B7 chord, the B7 major chord can be identified.

In some embodiments, fret data 508A can be used to identify any of the chords in FIGS. 11A-11G (including any alternative ways of forming the chords).

When comparing input data to fret data 508A for a scale progression, comparison module 511 can buffer previously received input data (e.g., in system memory or in storage 503) to account for timing of input. That is, since finger positions and/or string to fret contacts of a scale progression are received subsequent to one another (and thus at different times) comparison module 511 can retain prior input data for comparison to determine if notes are received in the appropriate order.

String mapping module 514 and comparison module 511 can interoperate to determine what sound data from sounds data 508C is to be output. For example, it may be that fret board input data 507B indicates a C major chord and strumming input data 507A indicates that strings 479A-479F were strummed. Accordingly, sound data for a C major chord with all strings strummed can be accessed from sound data 508C (even though string 479F may not be appropriate to strum). Output module 512 can convert the sound data to audio output data 509B and output audio output data 509B at a speaker in output components 514.

Accordingly, sound output from stringed instrument practice device 400 can be free form. That is, sound output can match that of an actual stringed instrument (e.g., a guitar) under similar conditions. Thus, if a chord is not properly selected, the sound output can reflect the non proper selection. If a finger is on top of or touching a fret, the sound output can reflect that the finger is on top of or touching the fret. Regardless of strings selected and/or strummed, the sound output corresponds to the selected and/or strummed strings even if the selected and/or strummed strings are not appropriate musically (e.g., are not a known chord).

Similar to output module 312, output module 512 can send visual output data 509A to output components 514. Output components 514 can include visual output components, such as a multi-color LED or display. Output data 509A can contain data that changes the color of multi-color LED 371.

Output data 509 can also contain messages for presentation at a display. Presented messages can indicate a chord or scale properly selected. For example, when a D# chord is properly selected on fret board 442, output data 509 can contain data for displaying a "D#" at a display. As described, displayed messages can provide hints as to why a chord or scale was not properly selected, other instructional messages, or encouragement. Message data can be stored in storage 503.

Communication module 513 can formulate processed output data 591 (e.g. digital data) indicating results any comparisons at comparison module 511. Communication module 513 can communicate processed output data 591 to other computing devices (e.g., a mobile phone, tablet, computer system, etc.) through communication components 506. Communication components 506 can include components for wireless (e.g. Infrared, Bluetooth or WiFi) and/or wired (e.g., USB or Ethernet) communication. Communication module 513 can also receive input data 592 (e.g., instructions, diagnostics, software updates, etc.) from other computing devices through communication components 506.

In some embodiments, elongate handle 414 also includes a microphone, a voice recognition module, voice recognition data, a recording module, and a playback module. The voice recognition and playback modules can be included in processing unit 501. Through voice commands, a user can instruct elongate handle 414 to record their playing (e.g., storing sound data sent to output module 512). Recordings can be stored in system memory or at storage 503. Through voice commands, a user can also instruct elongate handle 414 to playback or delete a recording. Thus, a user can re-listen to how they sound.

Figure 5B:
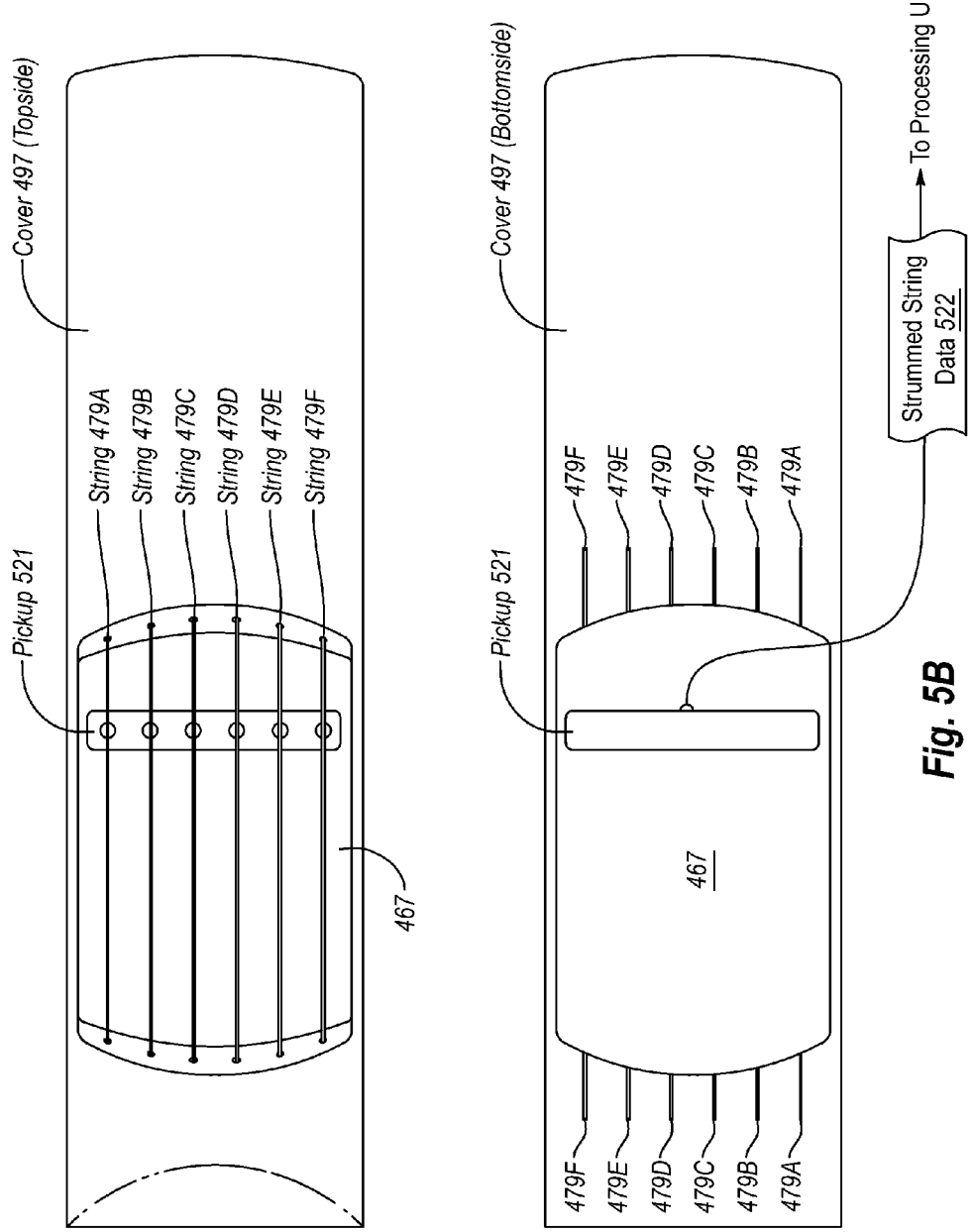
FIG. 5B-5D illustrate different examples of covers with strumming input sensing components.

In some embodiments, strumming input sensing components 502A include a pickup. For example, as depicted in FIG. 5B, cover 497 includes pickup 521. Pickup 521 can be a transducer that captures mechanical vibrations and converts then to an electrical signal. Pickup 521 can generate strummed string data 522 (an example of strumming input data 507A).

Pickup 521 can be virtually any type of pickup including a magnetic (single coil or humbucker) pickup. Vibration of one or more of strings 479A-479F can modulate the magnetic flux in a coil inside pickup 521 inducing an alternating current. The operation of pickup 521 can be a magnetic circuit in which the motion of strings 479A-479F varies the magnetic reluctance in the circuit by a magnet in pickup 521.

Pickup 521 can also be piezoelectric, condenser microphone, optical, etc.

In some embodiments, pickup 521 has a single output. In these embodiments, strummed string output data 522 contains a combined indication of strummed strings 479A-479F. In these embodiments, string mapping module 514 can detect and separate the combined indication (which is essentially a function) into individual string indications (e.g., using a Fourier transform or fast Fourier transform).

Generally, when one or more of strings 479A-479F are strummed, the transform of the one or more strings is a mathematical representation of the amplitudes and phases of the individual strings. A Fourier transform decomposes a combined indication into its constituent frequencies, its frequency spectrum. A composite waveform depends on time, and therefore is called the time domain representation. The frequency spectrum is a function of frequency and is called the frequency domain representation. Each value of the function can be a complex number (a complex amplitude) that encodes both a magnitude and phase component.

In these embodiments, strum data 508B can contain an indication of frequency domain and/or time domain data for each of strings 479A-479F to facilitate individual string identification.

In other embodiments, pickup 521 is a polyphonic pickup having more than one output (e.g., 2-6 outputs). In these other embodiments, detection and separation of a combined indication can still occur. For example, for less than six outputs, indication of strumming some strings can be combined together and subsequently separated at string mapping module 514.

More specifically, pickup 521 can be a hexaphonic pickup. A hexaphonic pickup can have an output for each of strings 479A-479F. This allows for separate strumming detection and processing for each of strings 479A-479F.

Figure 5C:
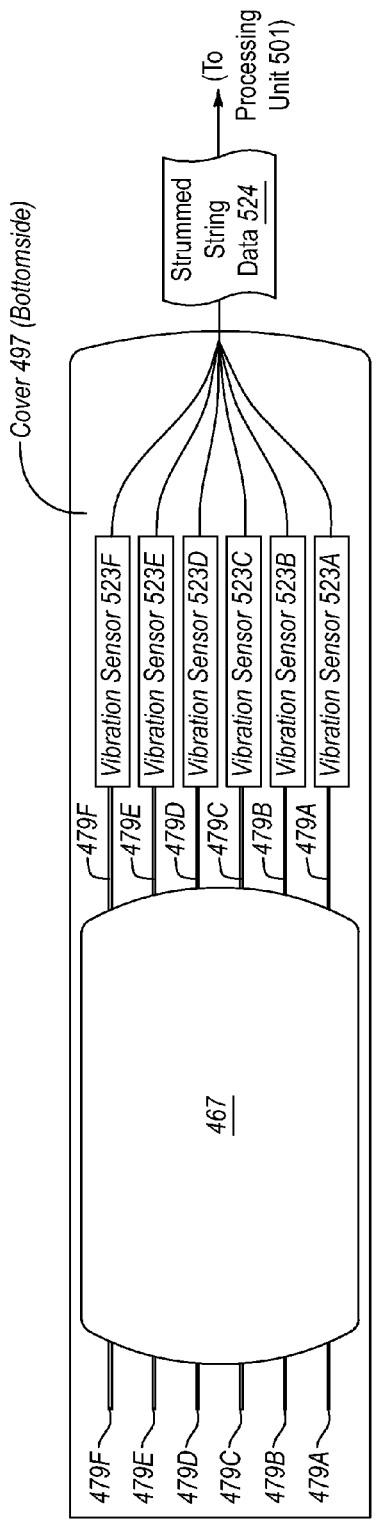

Turning to FIG. 5C, FIG. 5C depicts the bottom side of cover 497. As depicted, each of strings 479A-479F is connected to corresponding vibration sensor 523A-523F respectively. When any of strings 479A-479F are strummed, the corresponding vibration sensor 523A-523F can detect a vibration and indicate the strumming in strummed sting data 524 (and example of strumming input data 507A).

Using a vibration sensor per string, each of strings 479A-479F can be individual detected. In some embodiments, vibration sensors 523A-523F can send a digital signal indicating that corresponding string was strummed. In other embodiments, vibration sensor 523A-523F can send an analog signal indicating that corresponding string was strummed String mapping module 514 can process any received signals appropriately and refer to strum data 508B to identify strummed strings from among strings 479A-479F. A reduced number of vibration sensors can also be used.

Figure 5D:
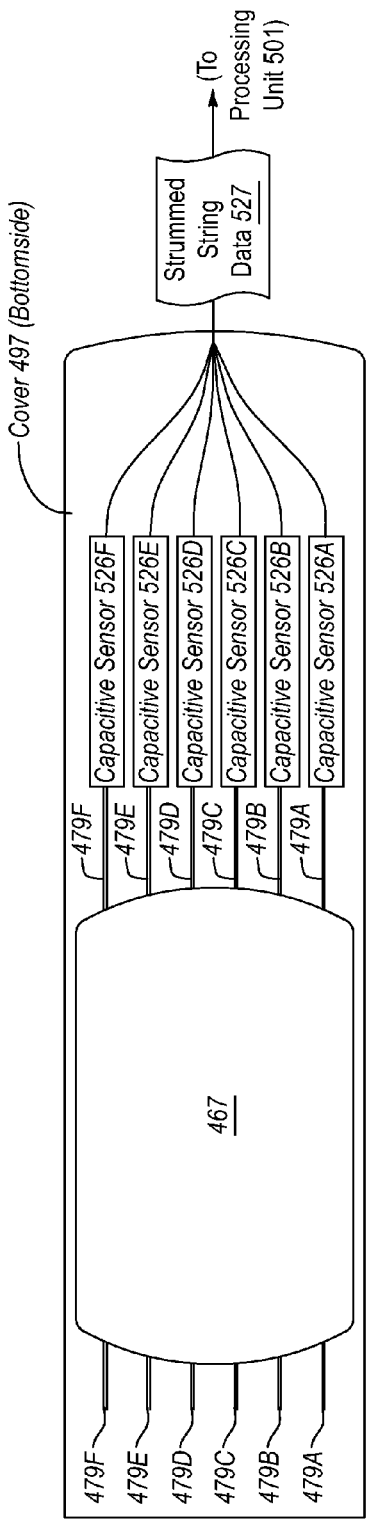

Turning to FIG. 5D, FIG. 5D depicts the bottom side of cover 497. As depicted, each of strings 479A-479F is connected to corresponding capacitive sensor 526A-526F respectively. When any of strings 479A-479F are strummed by human contact or a conductive element in contact with a human, the corresponding capacitive sensor 526A-526F can detect a change in capacitance and indicate the strumming in strummed sting data 527 (and example of strumming input data 507A).

Using a capacitive sensor per string, each of strings 479A-479F can be individual detected. In some embodiments, capacitive sensors 526A-526F can send a digital signal indicating that corresponding string was strummed. In other embodiments, capacitive sensor 526A-526F can send an analog signal indicating that corresponding string was strummed String mapping module 514 can process any received signals appropriately and refer to strum data 508B to identify strummed strings from among strings 479A-479F. A reduced number of capacitive sensors can also be used.

Combinations of vibration, capacitive, and other types of sensors, such as, for example, proximity sensors, can also be used to detect strumming of any of strings 479A-479F.

Returning back to FIG. 5A, output module 512 can send visual output data 509A and audio output data 509B to output components 514. Output components 514 can include visual and audio output components (e.g., LEDs, displays, speakers, headphone jacks, etc.) Turning now to FIG. 5E, output components 514 can include speaker 528. Audio output data 509B (based on a portion of sound data 508C) can be output at speaker 528 (or at a headphone jack). Turning to FIG. 5F, output components 514 can include speaker 528 and multi-color LED 529. Turning to FIG. 5G, output components 514 can include speaker 528 and display 531. Display 531 can be capable of displaying text and/or graphics in color and/or black and white Visual output data 509A can change the color of multicolor LED 529 based on the results of comparisons performed by comparison module 511 as previously described. Visual output data 509A can also contained data for displaying messages on display 531 based on the results of comparisons performed by comparison module 511 as previously described.

Connection to Other Devices

Figure 6:
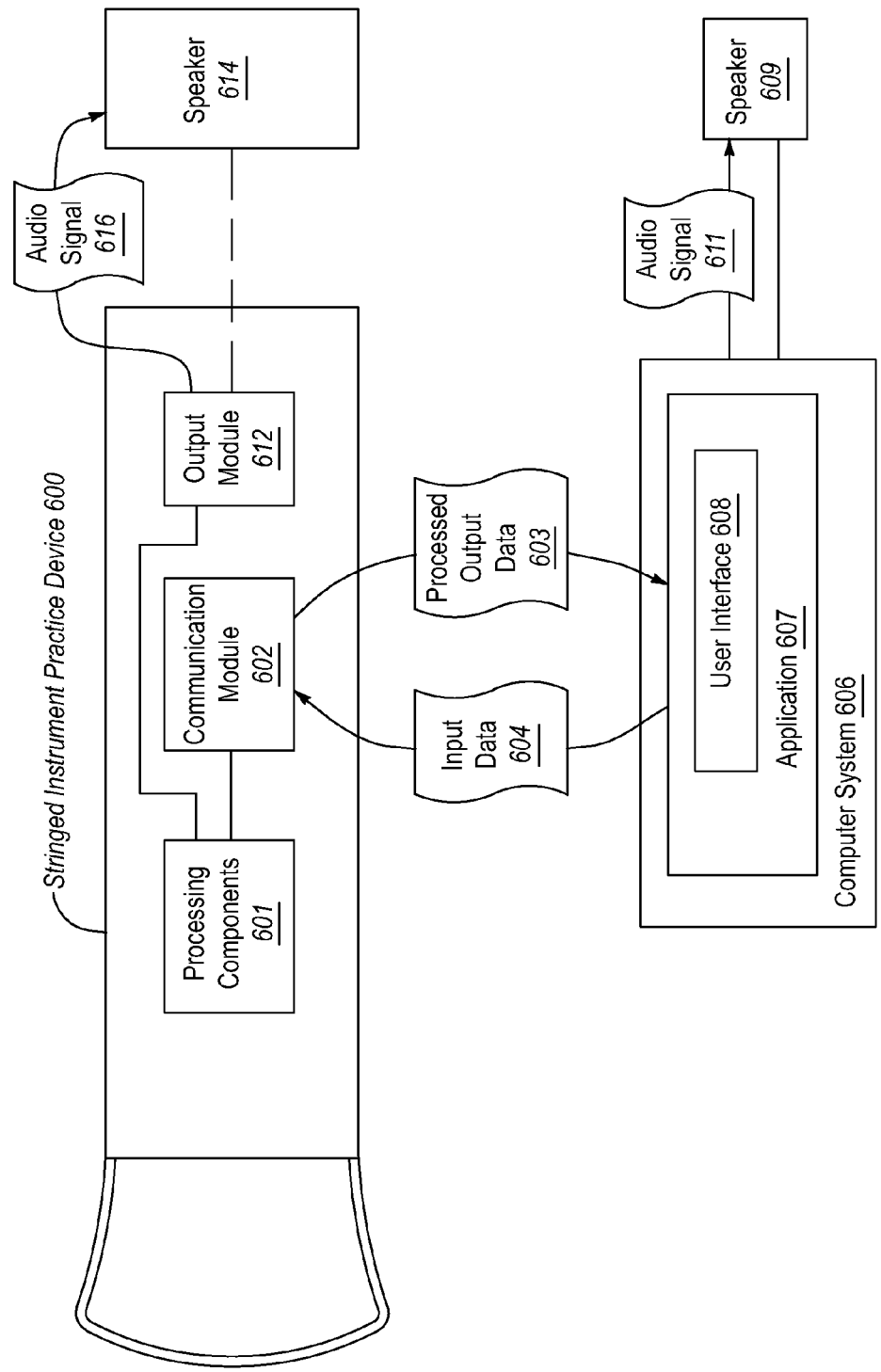
FIG. 6 illustrates a stringed instrument practice device in communication with a computer system.

FIG. 6 depicts stringed instrument practice device 600 in communication with computer system 606. As depicted, stringed instrument practice device 600 includes processing components 601, communication module 602, and output module 612. During use, output module 612 can output audio signal 616 to speaker 614, for example, an external speaker or even a head phone jack integrated into stringed instrument practice device 600. When stringed instrument practice device 600 includes a headphone jack, a user can practice on stringed instrument practice device 600 without creating a significant amount of noise. This can allow a user to practice in areas (e.g., on public transportation, in the office, etc.) they otherwise could not.

Communication module 602 can exchange data with application 607 at computer system 606. For example, communication module 602 can send processed output data 603 (e.g., sound data, an indication of selected notes or chords, an indication of strummed strings, messages similar to those sent to an internal display, etc.) to application 607 and can receive input data 604 (software updates, diagnostics, messages to be displayed at in internal display, or, referring very briefly to FIG. 9B an indication of what LEDs to illuminated) from communication module 602.

In some embodiments, use interface 608 depicts a replica of stringed instrument practice device 600. As strings of stringed instrument practice device 600 are manipulated (e.g., chords selected, strings strummed, etc.), this can also be indicated on user interface 608. When sound data is received from communication module 602, the sound can be sent to speaker 609 as audio signal 611 (which may be internal to computer system 606). Speaker 609 can output sound data 611. As such, based on string selection and strumming data received at stringed instrument practice device 600, corresponding sound can be emitted at speaker 609. Accordingly, computer system 606 (e.g., a mobile phone or tablet) can be used as an amplifier for stringed instrument practice device 600.

Alternately, speaker 609 may be a headphone jack. Using headphones, a user can practice on stringed instrument practice device 600 without creating a significant amount of noise. This can allow a user to practice in areas (e.g., on public transportation, in the office, etc.) they otherwise could not. Sound emitted at speaker 609 or a headphone jack of computer system 606 can be in combination with or separate from sound emitted at any internal speaker or headphone jack at stringed instrument practice device 600.

User interface 608 (e.g., at a computer monitor, mobile phone display, or tablet display) can also provide richer feedback than may be possible at an internal display, such as, for example, display 531. For example, video tutorials or more complex graphics can be presented at user interface 608 to provide instruction to a user of stringed instrument practice device 600. In some embodiments, application 607 can include one or more games to assist a user in learning how to make chords, perform scale progressions, etc.

Figure 7:
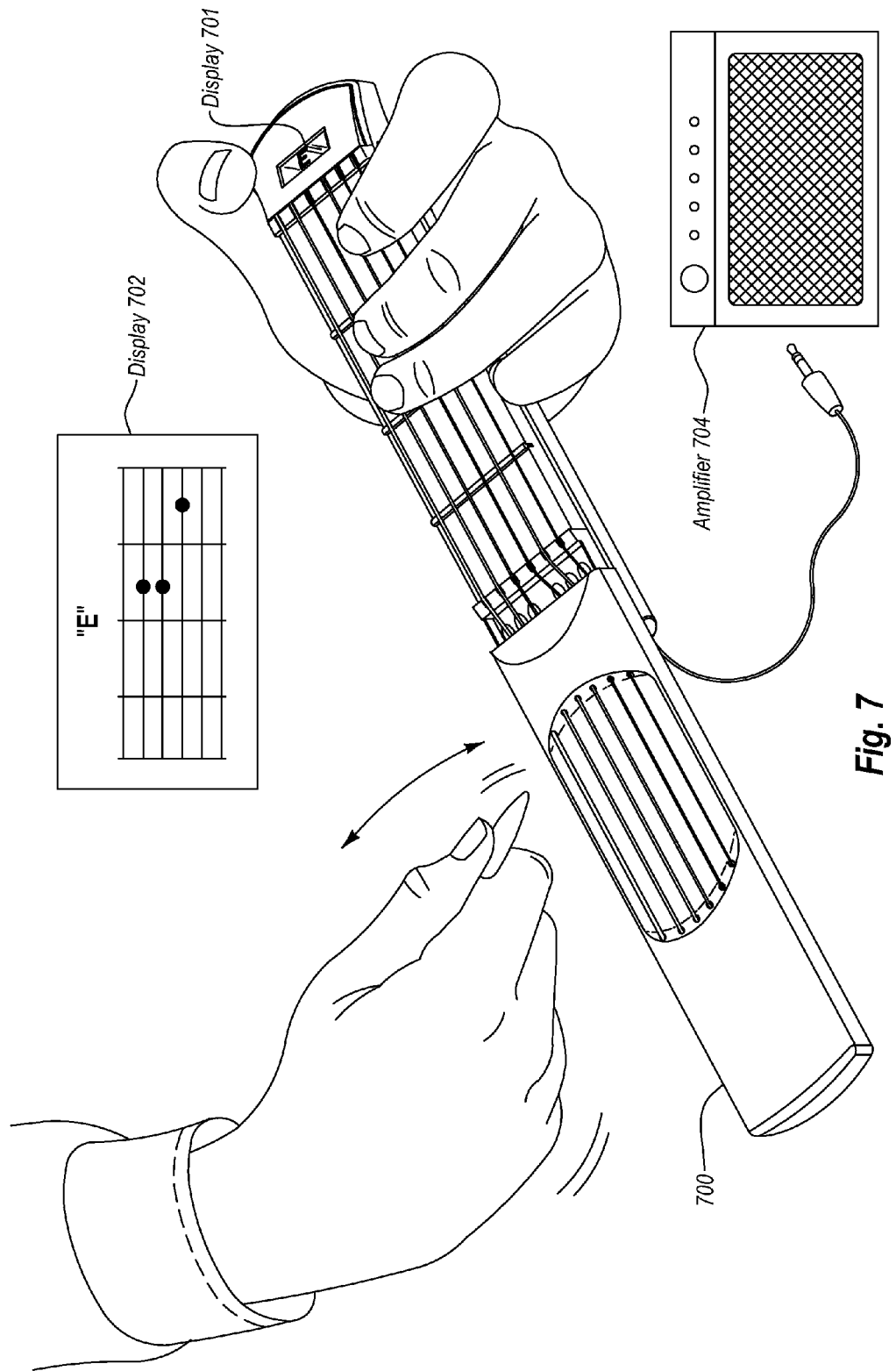
FIG. 7 illustrates another example of a stringed instrument practice device.

In some embodiments, a stringed instrument practice device includes a jack for connecting directing to an external audio amplifier. FIG. 7 depicts stringed instrument practice device 700. As depicted, stringed instrument practice device 700 can be plugged into amplifier 704. The user has correctly formed an E major chord. Correction formation of the E major chord is indicated on display 701. The finger positions for the E major can be depicted on display 702 (e.g., a computer monitor or a display of a mobile phone or tablet). From display 702 the user can attempt to form the E major cord. When successful, "E" can be indicated on display 701. Strumming the strings of stringed instrument practice device 700 with fingers in the depicted position can cause the sound of an E major chord to be emitted at amplifier 704.

Finger Placement Indication

Embodiments of the invention include providing visual cues on a fret board to assist a user with finger placement on the fret board. Given visual cues, a user can more easily learn finger positions for chords and scales. For example, lights can indicate finger positions within different frets where fingers are to be placed to make a chord. In some embodiments, LEDs are embedded in a fret board to indicate finger positions.

Figure 8:
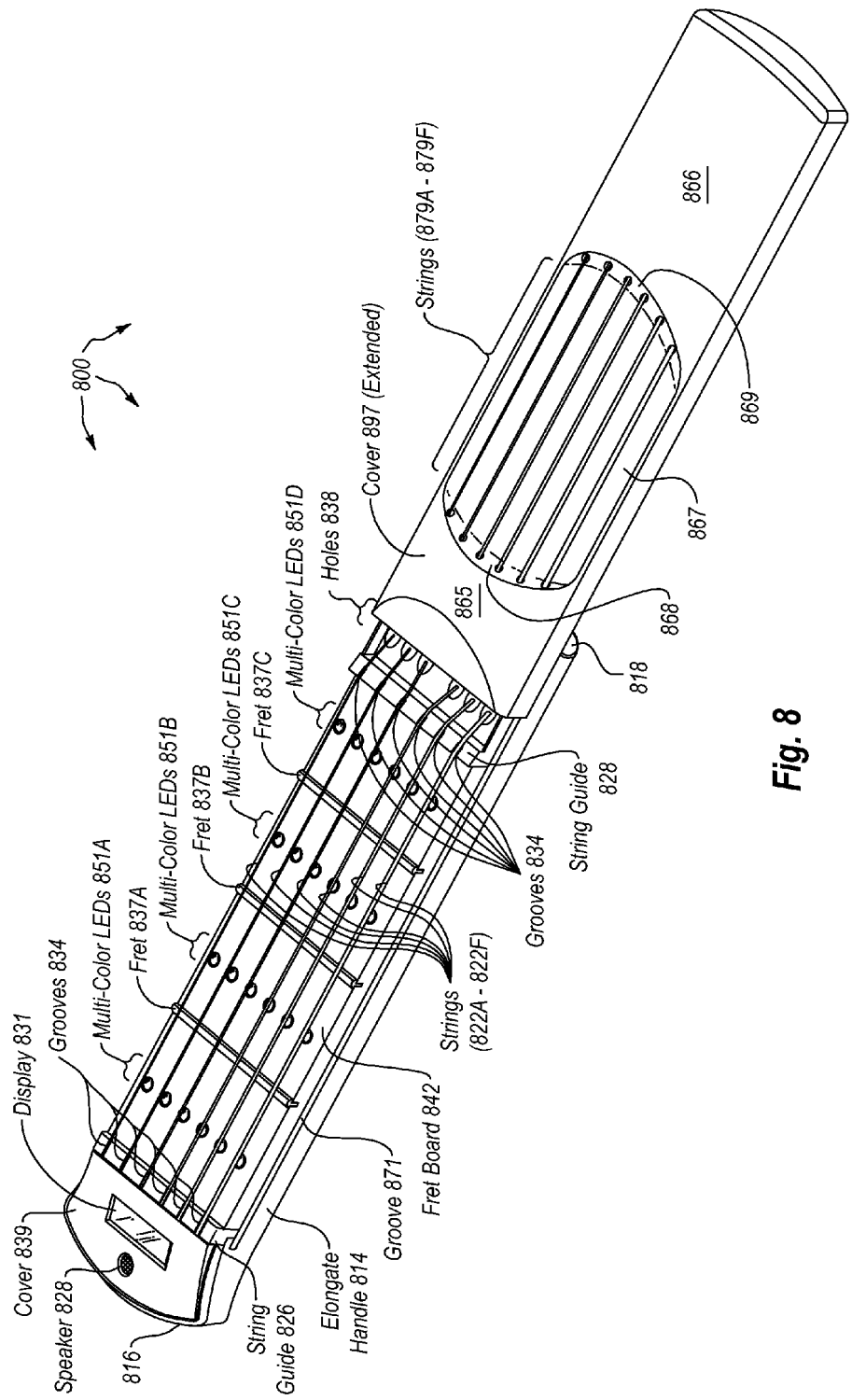
FIG. 8 illustrates another example of a stringed instrument practice device.

FIG. 8 illustrates a view of another example stringed instrument practice device 800. FIG. 8 depicts a view of the front side of stringed instrument practice device 800 (or the side of stringed instrument practice device 800 that faces away from a user when practicing). As depicted in FIG. 8, stringed instrument practice device 800 includes elongate handle 814 (having ends 816 and 818), cover 839, and cover 897. Cover 897 is extended towards end 818. As further depicted, cover 897 includes portions 865, 866, 867, 868, and 869 and strings 879.

As depicted in FIG. 8B, stringed instrument practice device 800 further includes strings 822A-822F, frets 837A-837C (three frets), string guide 828, and holes 838. Elongate handle 814 can be constructed from various materials and combines a neck portion along with a fret board on top of the neck portion.

Strings 822A-822F are then attached to elongate handle 814. In some embodiments, each of strings 822A-422F correspond with and can be referred to a musical note. For example, strings 822A-822F can correspond with and be referred to as musical notes of a guitar. String 822A (furthest away during use) can correspond to a musical note "E". String 822B can correspond to a musical note "B". String 822C can correspond to a musical note "G". String 822D can correspond to a musical note "D". String 822E can correspond to a musical note "A". String 822F (closest during use) can correspond to a musical note "E" (often referred to as low E).

The height of portion 867 can be lower relative to portions 865 and 866. Strings 879 are included within portion 867. Strings 879 can be configured with a size, height, and spacing similar to strings 822. For example, the spacing between individual strings of strings 879 can be essentially the same as the spacing between individual strings of strings 822. In some embodiments, the height of strings 879 are lower relatively to portions 865 and 866 of cover 897. This reduces the likelihood of strings 879 catching on external objects.

Elongate handle 814 also includes groove 871. Groove 871 runs essentially between just past string guide 826 and end 818 on the upside of elongate handle 814 (i.e., the side of elongate handle 814 that faces up when a user is practicing). Another similarly configured groove (not shown in FIG. 8) can be included on the downside of elongate handle 814 (i.e., opposite of groove 871 or the side of elongate handle 814 that faces down when a user is practicing).

Cover 897 can include guide members that extend into groove 871 and into the similarly configured groove on the downside of elongate handle 814. The guide members reduce the possibility of cover 897 disengaging from elongate handle 814 due to forces other than those moving cover 897 essentially parallel to the grooves (e.g., sliding cover 897 towards end 818).

When cover 897 is extended, strings 879 can be positioned such that a user of stringed instrument practice device 800 can strum strings 879 (e.g., to simulate strumming the strings of a guitar, bass, banjo, etc.).

In some embodiments, cover 897 is a single (e.g., molded or extruded) plastic piece. Strings 879 can be attached to cover 897 separately. Each of strings 879A-879F can also correspond with and can be referred to a musical note. For example, strings 879A-879F can correspond with and be referred to as musical notes of a guitar (and can match strings 822A-822F respectively). String 879A (furthest away during use) can correspond to a musical note "E". String 879B can correspond to a musical note "B". String 879C can correspond to a musical note "G". String 879D can correspond to a musical note "D". String 879E can correspond to a musical note "A". String 879F (closest during use) can correspond to a musical note "E" (often referred to as low E). Strings 879A-879F can be attached to cover 897 as described with respect to FIG. 4C.

Elongate handle 814 further includes multi-color LEDs 851A, 851B, 851C, and 851D. One or more multi-color LEDs in one or more rows of multi-color LEDs can be illuminated to indicate locations for finger placements. Placing fingers in the illuminated locations can be used to make a chord or move through a scale progression.

Elongate handle 814 further includes speaker 828 (and can also or alternately include a head phone jack). Elongate handle 814 also includes display 831. Display 831 can be configured to display text and/or graphics in color and/or black and white.

Although stringed instrument practice device 800 is depicted with three frets, other numbers of frets, such as, for example, four frets, five frets, six frets, etc., can be used.

Figure 9A:
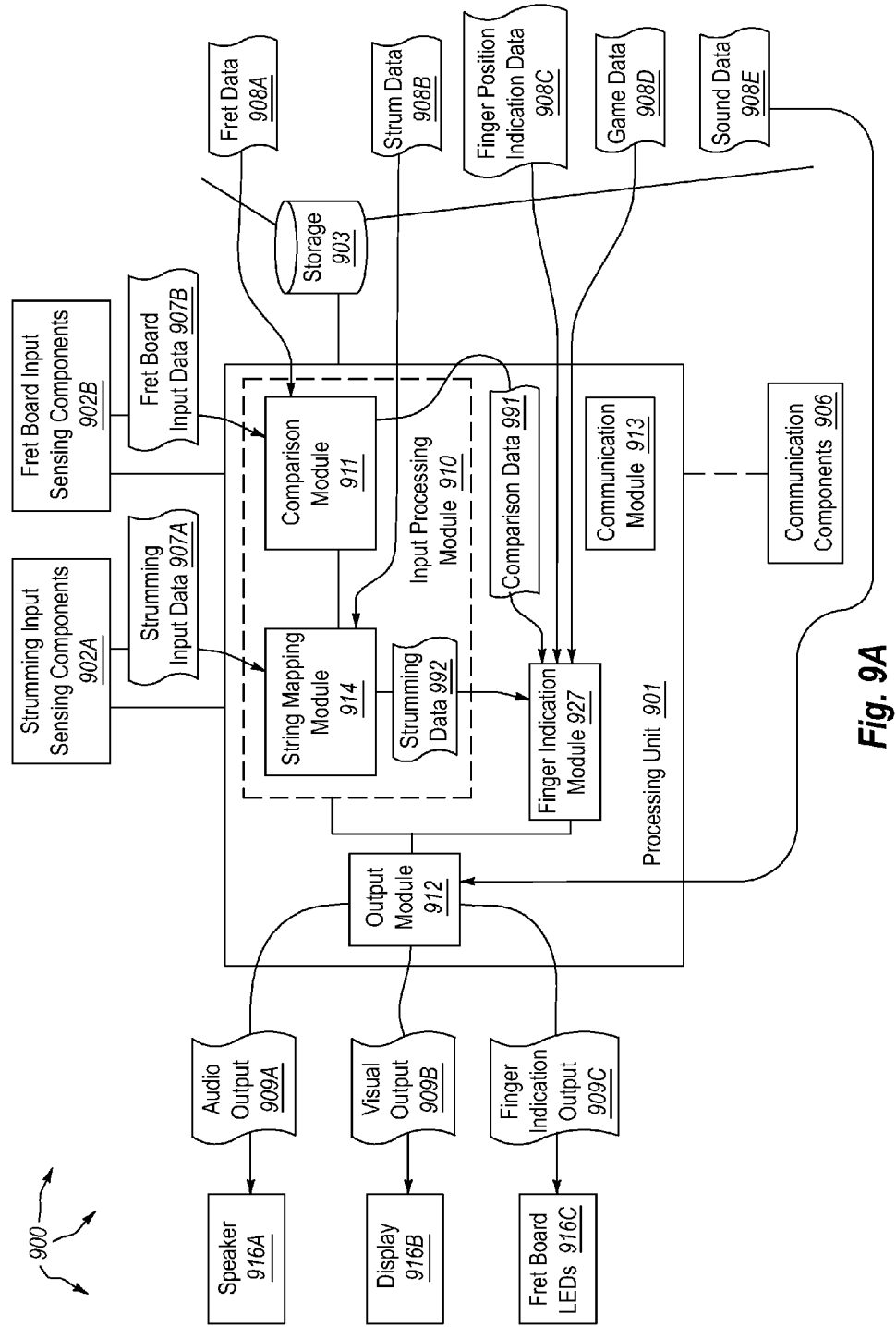
FIG. 9A illustrates an example architecture of components that can be included at and/or contained within a stringed instrument practice device.
Figure 9B:
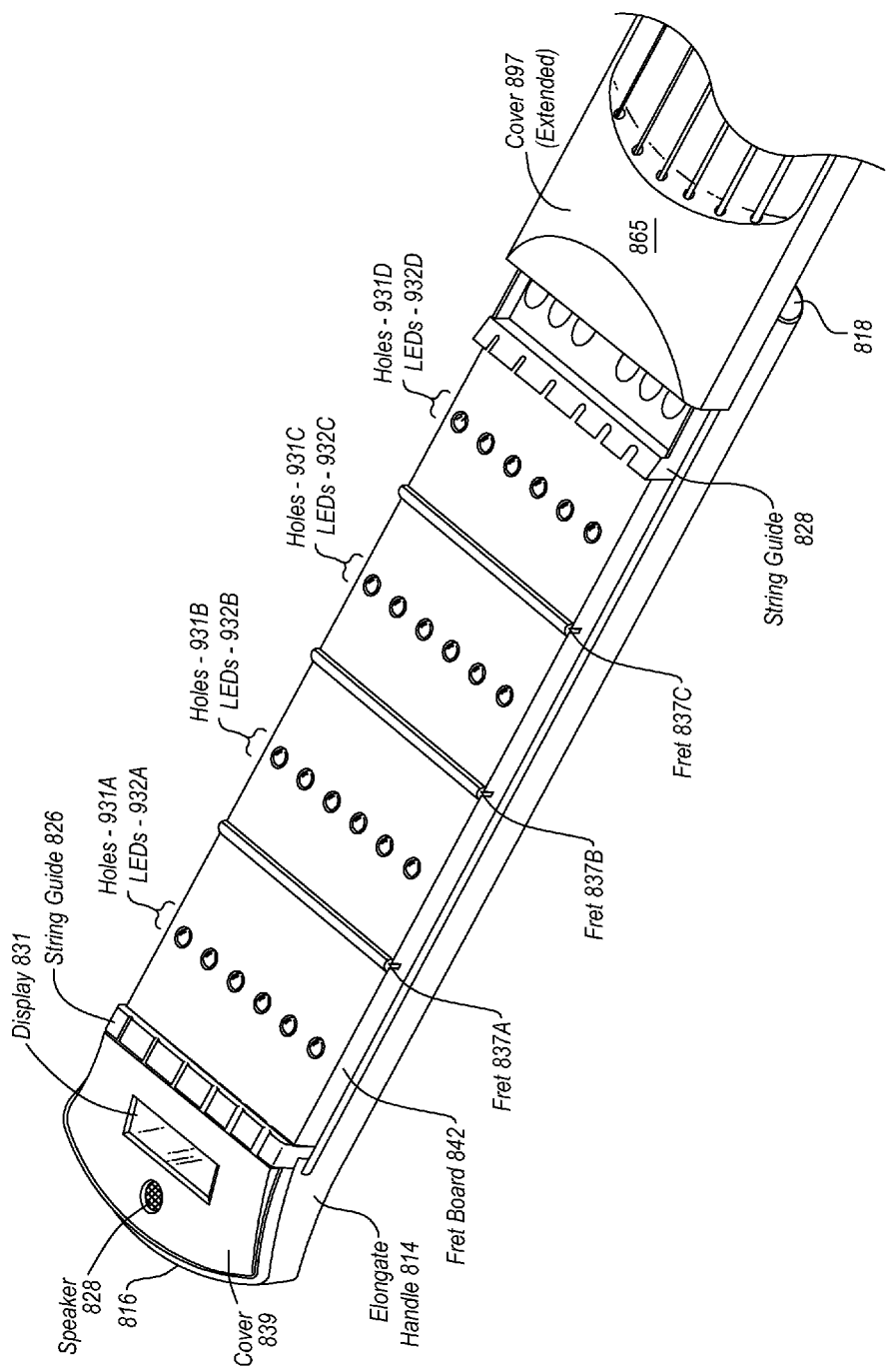
FIG. 9B illustrates an example of LEDs included in a portion of a fret board.

FIG. 9A depicts example architecture 900 of components that can be included at and/or contained within elongate handle 814. As depicted, architecture 900 includes processing unit 901, strumming input sensing components 902A, fret board input sensing components 902B, storage 903, speaker 916A, display 916B, and fret board LEDs 916C, and communication components 906. Processing unit 901 further includes input processing module 910, output module 912, and communication module 913. Processing unit 901, strumming input sensing components 902A, fret board input sensing components 902B, storage 903, speaker 916A, screen 916B, and fret board LEDs 916C, and communication components 906 can be included at and/or contained within elongate handle 814.

Storage 903 stores fret data 908A, strum data 908B, sound data 908C, game data 908D, and sound data 908E. Similar to fret data 308, fret data 908A can include chord data, scale data, etc. that indicates finger positions and/or fret to string contact locations for known musical chords, scales, etc. Similar to strum data 508B, strum data 908B can include data for determining what combination of strings (from among the approximately 63) combinations have been strummed.

Similar to sound data 508C, sound data 908E can include data (e.g., in one or more Musical Instrument Digital Interface ("MIDI") compatible file formats) that can be used to generate audio output data. For example, sound data 908E can store information on what note to play and when, pitch and timbre blending information, loudness, vibrato, velocity, panning, cues, clock signals, etc. Sound data 908E can be used to complete a signal chain and produce audible sound. Processing unit 901 can also implement appropriate MIDI algorithms to convert sound data 908E into audio output data (or MIDI messages). For example, processing unit 901 can have a MIDI synthesizer built in.

In some embodiments, sound data 908E can be used to produce sound corresponding to any of the chords in FIGS. 11A-11G.

Game data 908D can include data for fret exercise or other practice games to assist users in practicing. For example, game data can include timing for processing through the major chords and specified intervals or performing a chord progression at a specified pace. Game data 908D can also include data for forming actual songs from sound data 908E. A game can then be to play a portion of a song correctly.

Finger position indication data 908C can be used to indicate finger positions on fret board 842 (e.g., by illuminating LEDs).

Generally, input processing module 910 can receive data from input sensors and determine what sounds to output from sound data 908E and/or what finger positions to access from finger position indication data 908C. Input processing module 910 can include modules for processing any of a variety of different types of input, such as, for example, digital or analog signals, electrical characteristic values (resistance, capacitance, inductance), mechanical system data (vibration data). etc., In some embodiments, input processing module more specifically includes string mapping module 914 and comparison module 911.

Strumming input sensing components 902A can be similar to strumming input sensor components 502A (e.g., a pickup, vibration sensors, capacitive sensors, etc.) and can be used to detect when any of strings 879A-879F (of combinations thereof) are strummed Strumming input sensing components 902A can formulate strumming input data 907A and send strumming input data 907A to string mapping module 914. String mapping module 914 can refer to strum data 908B to determine, based on strumming input data 907A, if any strings have been strummed and, if so, what combination of strings 879A-879F that have been strummed.

Fret board input sensing components 902B can be similar to input sensing components 302 (e.g., touch sensitive material or an electric circuit components) and can be used to sense finger locations on fret board 842 and/or string to fret contact on fret board 842. Input sensing components 902B can formulate fret board input data 907B and fret board input data 907B to comparison module 911.

Upon receiving input data 907B, comparison module 911 can compare input data 907B to fret data 908A to determine if input data 907B indicates a known chord or portion of a scale progression. For example, comparison algorithm 911 can detect finger placement position and/or string to fret contact per fret and compare detected finger placement position and/or string to fret contact per fret to fret data 908A. Per fret, comparison of finger placement position and/or string to fret contact to fret data 908A can be used to identify a chord. For example, if finger positions and/or fret to string contacts indicate any of the finger placements for a B7 chord, the B7 major chord can be identified.

In some embodiments, fret data 908A can be used to identify any of the chords in FIGS. 11A-11G (including any alternative ways of forming the chords).

When comparing input data to fret data 908A for a scale progression, comparison module 911 can buffer previously received input data (e.g., in system memory or in storage 903) to account for timing of input. That is, since finger positions and/or string to fret contacts of a scale progression are received subsequent to one another (and thus at different times) comparison module 911 can retain prior input data for comparison to determine if notes are received in the appropriate order.

String mapping module 914 and comparison module 911 can interoperate to determine what sound data from sound data 908E is to be output. For example, it may be that fret board input data 907B indicates an A# chord and strumming input data 907A indicates that strings 979A-979E were strummed. Accordingly, sound data for an A# chord with the five strings strummed can be accessed from sound data 908E. Output module 912 can convert the sound data to audio output data 909A and output audio output data 909A at a speaker 916A.

Accordingly, sound output from stringed instrument practice device 800 can be free form. That is, sound output can match that of an actual stringed instrument (e.g., a guitar) under similar conditions. Thus, if a chord is not properly selected, the sound output can reflect the non proper selection. If a finger is on top of or touching a fret, the sound output can reflect that the finger is on top of or touching the fret. Regardless of strings selected and/or strummed, the sound output corresponds to the selected and/or strummed strings even if the selected and/or strummed strings are not appropriate musically (e.g., are not a known chord).

Finger indication module 927 can determine (e.g., next) finger positions to illuminate on fret board 842 for a chord or note. Finger indication module 927 can receive strumming data 992 (indicating strummed strings) and comparison data 991(indicating if current fret board input indicates an appropriate note or chord). Finger indication module 927 can also access game data 908D. From one or more of strumming data 992, comparison data 991, and game data 908D, finger indication module 927 can determine what data to access from finger position indication data 908C. For example, if a scale progression game is being played, finger indication module 927 can determine to highlight the same note again, if the user failed to select the note. On the other hand, finger indication module 927 can determine to highlight the next note in the progression, if the user properly selected a current or prior note.

When providing assistance for playing a song, finger indication module 927 can continue to move to subsequent chords and notes even if the user is not getting all the chords or notes correct. Alternately, finger indication module 927 can slow down transitions to make it easier for the user. Finger indication module 927 can use heuristics to determine how and when to adjust the speed of transitions for a user based on a detected level of skill.

When a next chord or note is determined, finger indication module 927 can indicate the chord or note to output module 912. In some embodiments, elongate handle includes physical controls for controlling the presentation of finger location indications, for example, loading, changing, speeding up, slowing down, or pausing chord and/or note transitions. The physical controls can supply input to finger indication module 927. In other embodiments, elongate handle 814 includes a microphone, a voice recognition module, and voice recognition data. The voice recognition module can be connected to finger indication module 927. Through voice commands, a user can control the presentation of finger location indications. For example, saying "pause" can pause transitions, saying "slow down" can slow down transitions.

Output module 912 can send audio output 909A to speaker 916A (or to a head phone jack). Output module 912 can send visual output 909B to display 916B (or a multi-color LED on cover 839). Output module 912 can send finger indication output 909C to fret board LEDs 916C (or other visual highlighting components on fret board 842).

Similar to earlier described embodiments, communication module 913 can interoperate with communication components 906 to send data to and receive data from other computing devices (e.g., a mobile phone, tablet, computer system, etc.). Communication components 906 can include components for wireless (e.g. Infrared, Bluetooth or WiFi) and/or wired (e.g., USB or Ethernet) communication.

In some embodiments, LEDs are included in individual holes in each fret. For example, turning to FIG. 9B, LEDs 932A, 932B, 932C, and 932D are included in holes 931A, 931B, 931C, and 931D respectively. In other embodiments, a slot can include multiple LEDs.

Embodiments of the invention also include multiple rows of LEDs per fret. When multiple fingers are to be placed in the same fret, a light for each finger can be illuminated in a row of LEDs closer to or further form the fret to indicate finger position with more granularity. A piece of partially opaque material (e.g., plastic, polymer, laminate, etc.) can be placed over rows of LEDs so that the LEDs are not visible except when illuminated. The partially opaque material can be adhered to or built as part of fret board 842.

Figures 9C, 9D, 9E:
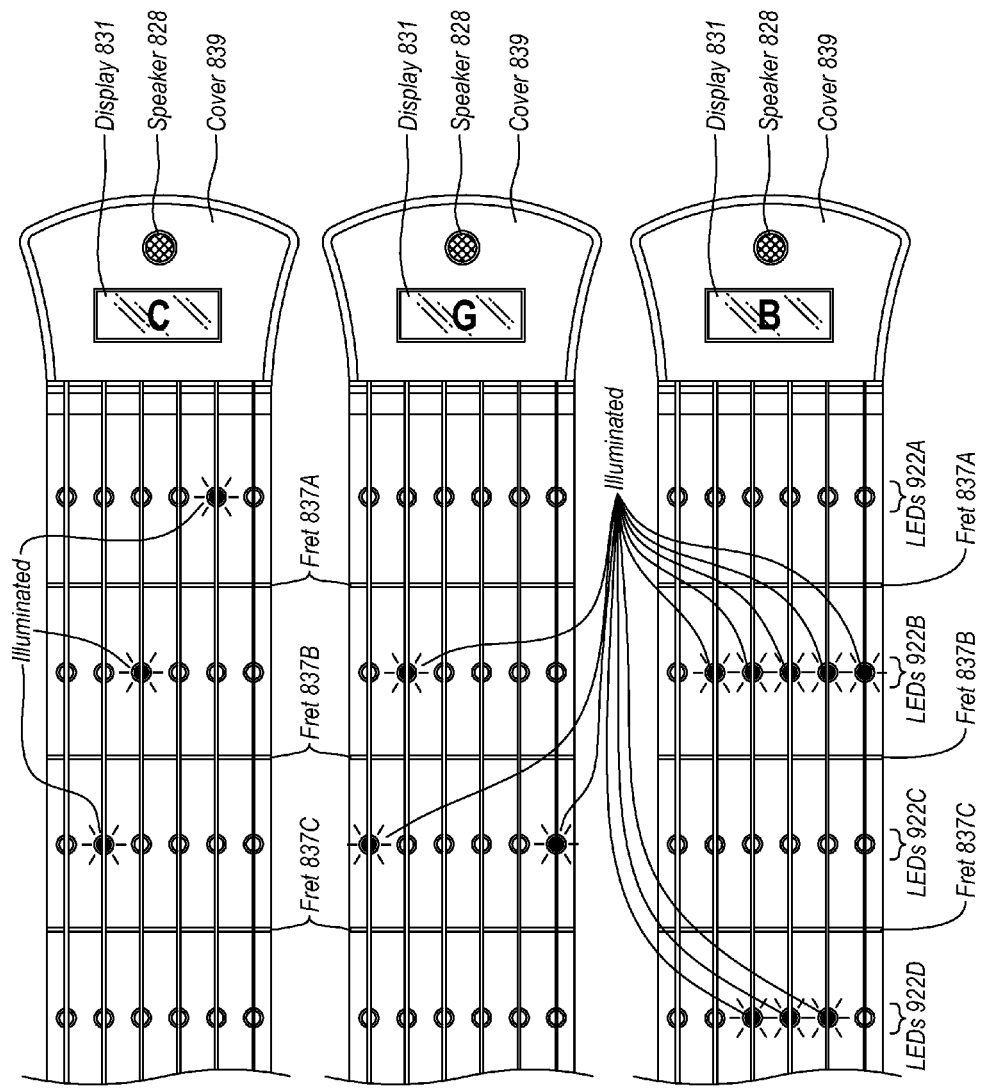
FIGS. 9C-9E examples of string instrument practice devices with display and sound output components.

FIG. 9C depicts illumination of LEDs indication finger positions for a C major chord. The "C" within display 831 indicates that the illuminated LEDs are for the C major chord. FIG. 9D depicts illumination of LEDs indication finger positions for a G major chord. The "G" within display 831 indicates that the illuminate LEDs are for the G major chord. FIG. 9E depicts illumination of LEDs indication finger positions for a B major chord. The "B" within display 831 indicates that the illuminate LEDs are for the B major chord.

When illuminated LEDs indicate finger positions for a chord, the indicated chord can be displayed on a display. The indicated chord can be displayed in one color (e.g., blue) to indicate what chord is made when fingers are placed in the positions of the illuminated LEDs. If the chord is then successfully formed, the indicated chord can be displayed in a second color (e.g., green). On the other hand if the chord is not successfully formed, the indicated chord can be displayed in a third color (e.g., red).

In some embodiments, each finger corresponds to a color. LEDs can be illuminated in finger specific colors to indicate what finger is to be placed at an indication position on a fret board. For example, in FIG. 10A, LEDs are illuminated to indicate how to form an E major chord. LED $922B_5$ is illuminated in Indigo to indicate the location for the index finger, LED $922B_5$ is illuminated in Magenta to indicate the location for the middle finger, and LED $922A_3$ is illuminated in Red to indicate the location for the ring finger. Other colors can be used to indicate locations for other fingers (e.g., Pink for pinky) when more than three fingers are used to form a chord.

Figure 10A:
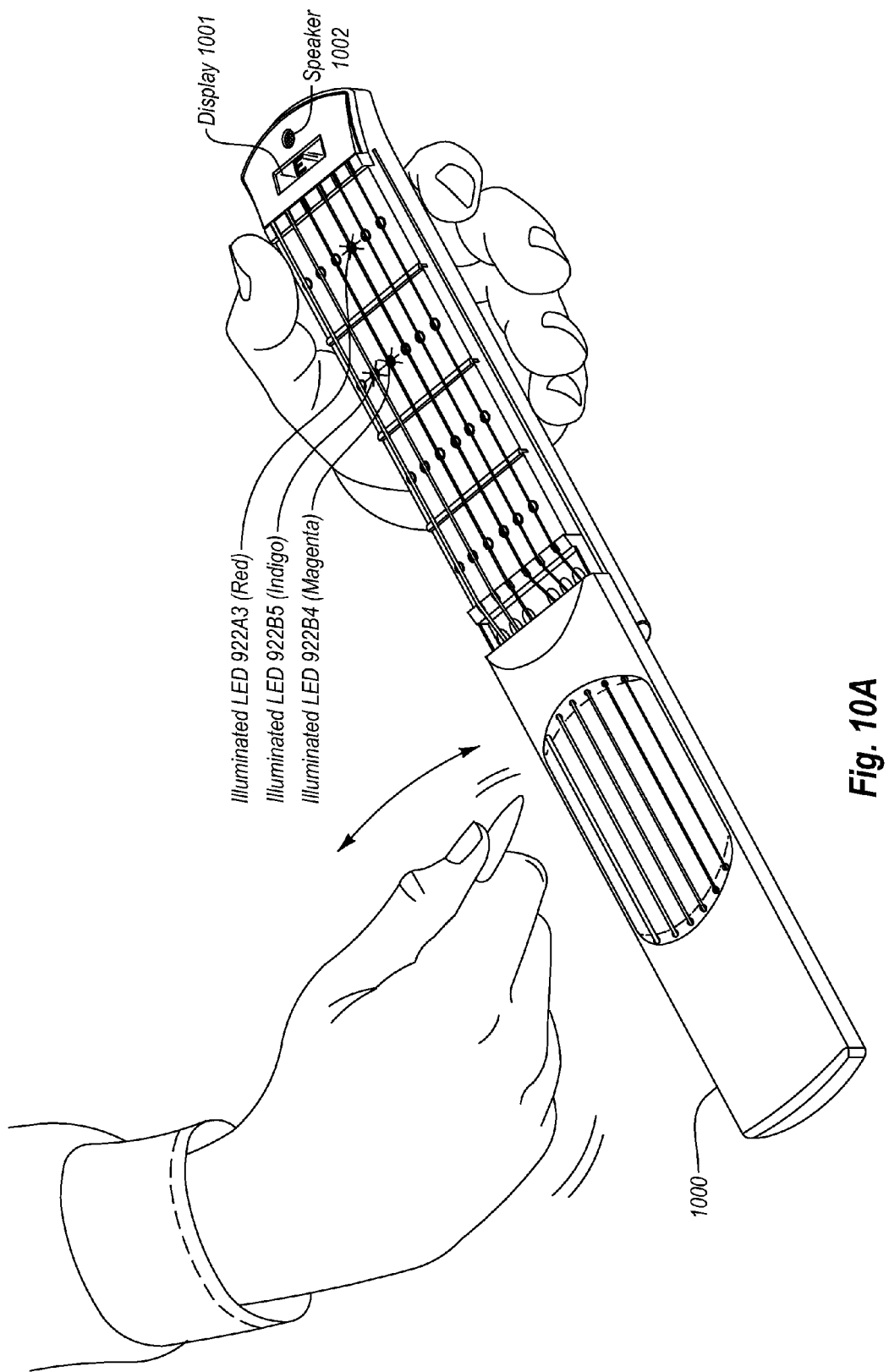
FIGS. 10A and 10B illustrate an example stringed instrument practice device in use.
Figure 10B:
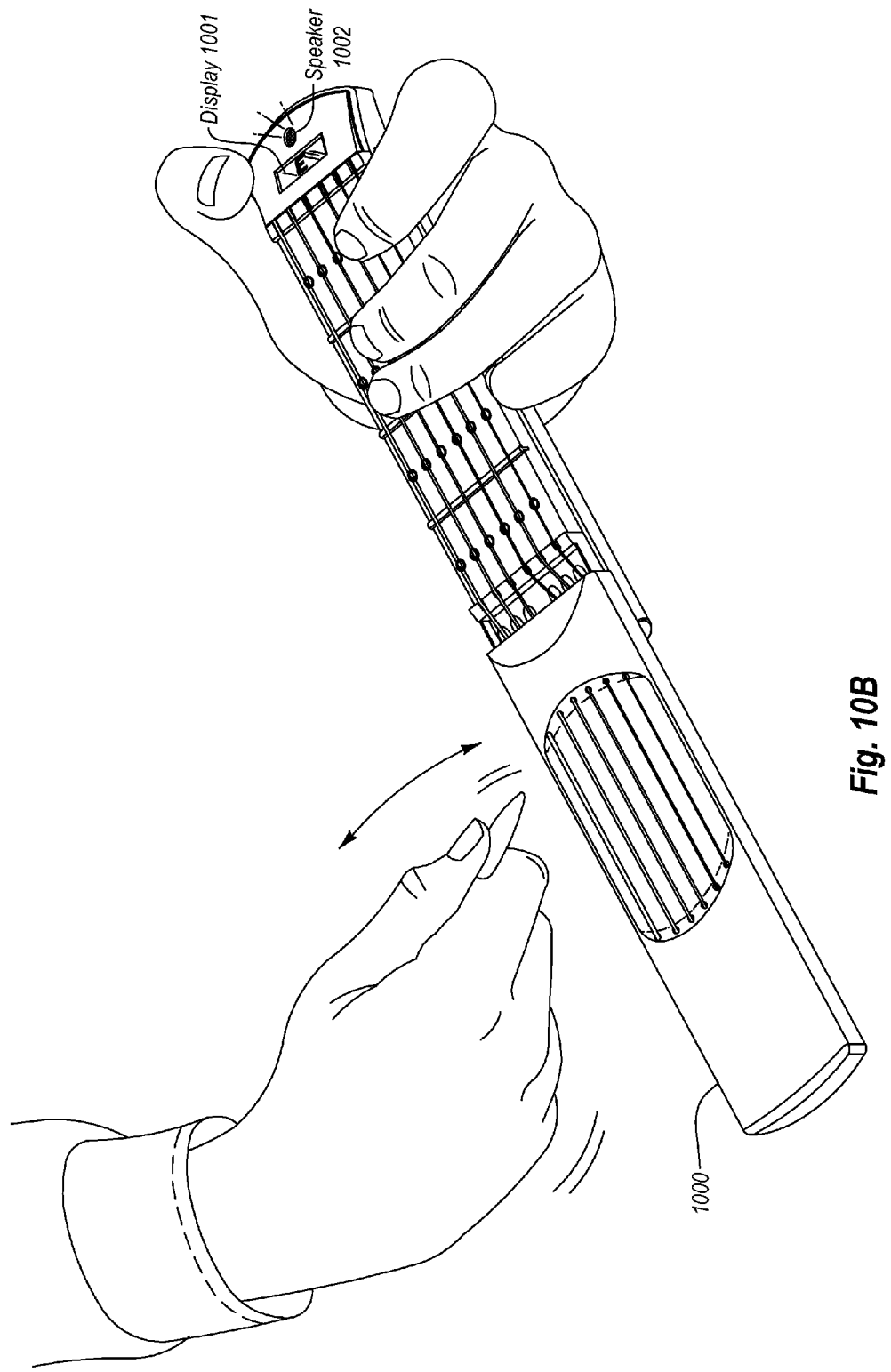
Figure 11A:
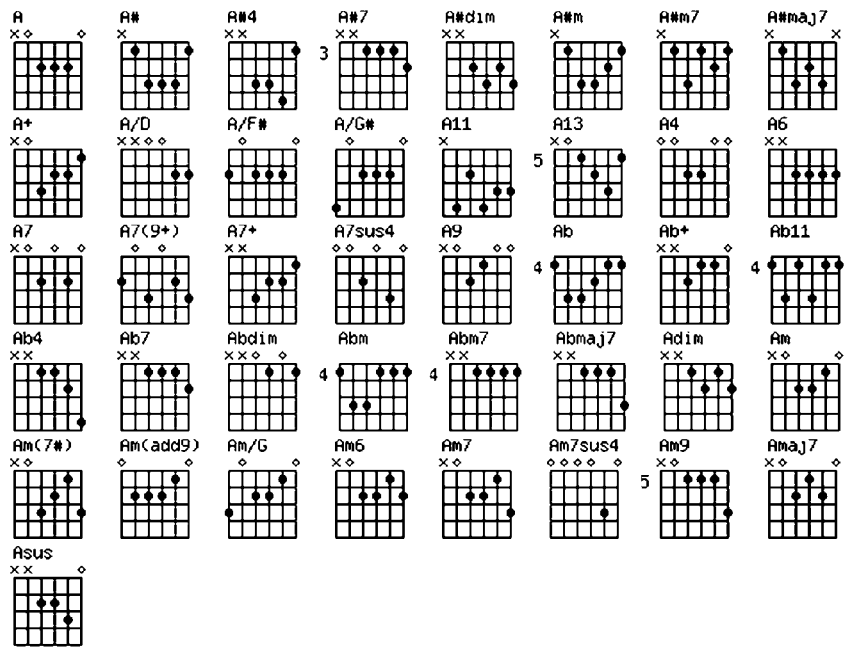
FIGS. 11A-11G illustrate the finger positions used to form various different chords on a fret board of a guitar.
Figure 11B:
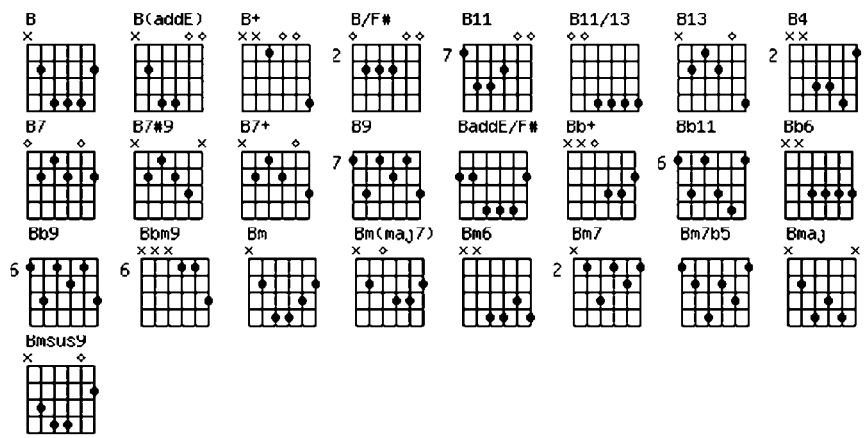
Figure 11C:
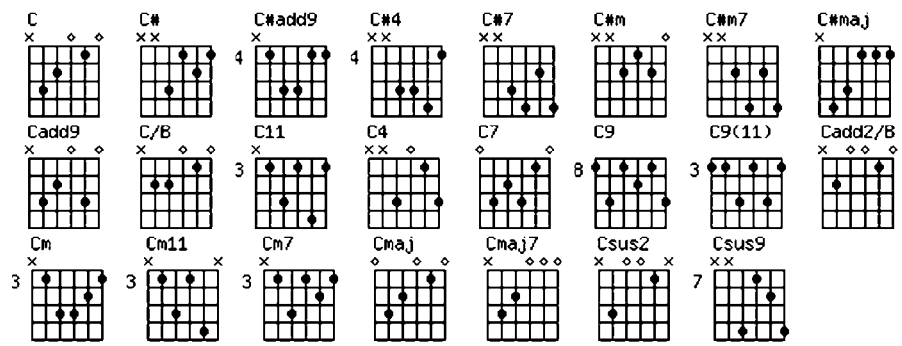
Figure 11D:
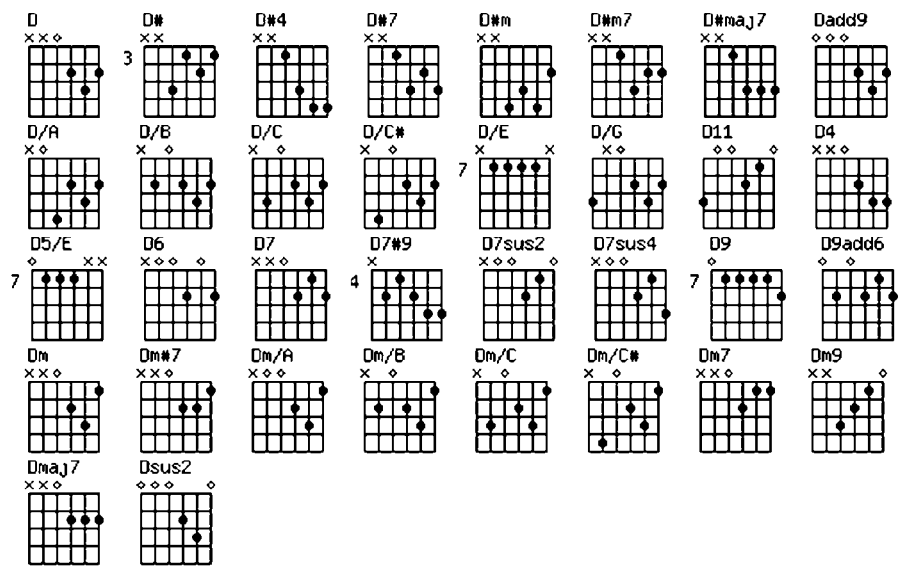
Figure 11E:
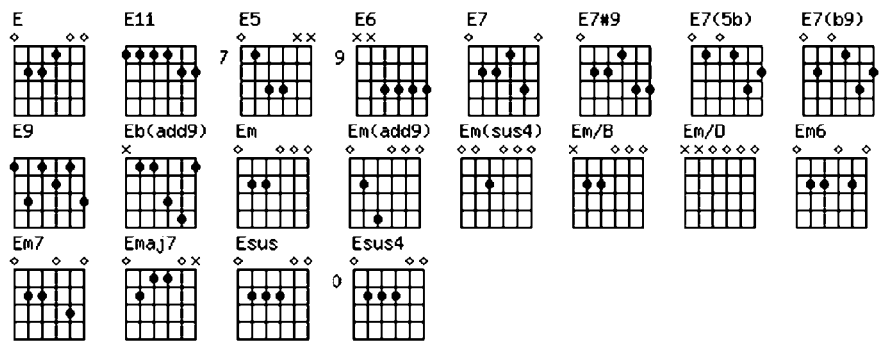
Figure 11F:
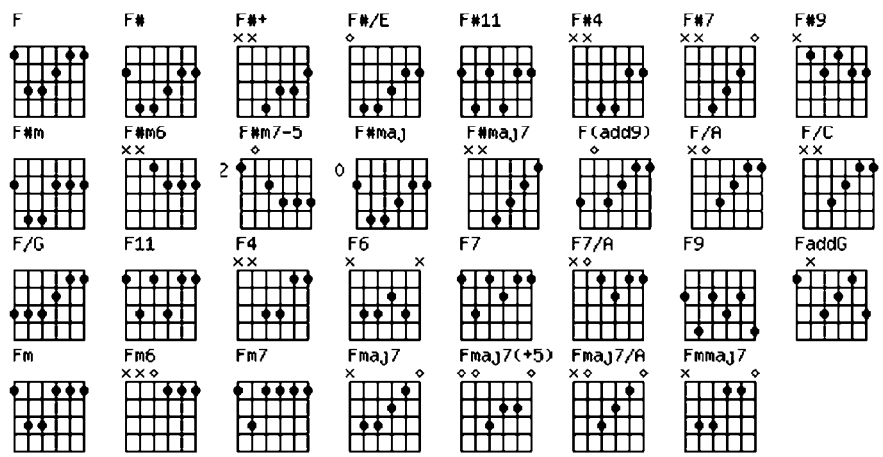
Figure 11G:
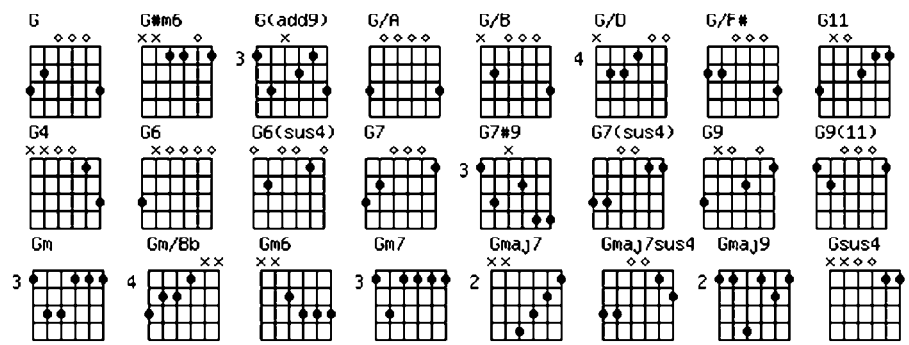

In FIG. 10A, the "E" in display 1001 can initially be displayed in blue or yellow. Turning to FIG. 10B, the user properly forms the E major chord and strums. In response, the "E" in display 1001 can transition to being displayed in green and sound for an E major chord can be emitted from speaker 1002 (or to head phones if connected).

In some embodiments, a set of six ridges is used to simulate strings (e.g., strings 479A-479F or stings 879A-879F) on a retractable/extendable cover. In these embodiments, vibrations sensor can be connected to each ridge to detect strumming. Each ridge can correspond to a string on a corresponding elongate body. Output from the vibration sensors can be processed similar to that of output for strings.

Embodiments of the invention can be powered by batteries or through connection to an external power source.

Embodiments of the present invention may comprise or utilize a special purpose or general-purpose computer including computer hardware, such as, for example, one or more processors (e.g., any of processing units 301, 501, and 801) and system memory. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices), such as, for example, storage 303, 503, and 903, includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Components of the invention can be connected to one another over (or is part of) a network, such as, for example, a Local Area Network ("LAN"), a Wide Area Network ("WAN"), and even the Internet. Accordingly, computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. An electronic device used to practice a stringed musical instrument, the device comprising:

an elongate handle representing a neck portion of the stringed musical instrument, the elongate handle including a first end, a second end, a first side, a second side, and a top portion, the top portion including a plurality of frets representing a portion of a fret board, the elongate handle sized and configured to fit in the hand of a user of the device, the first end representing the end of the stringed musical instrument where string tension is adjusted;

at least four strings;

for each of the at least four strings:

a first string holder at the first end for holding the string in place; and a second string holder at the second end for holding the string in place;

wherein the at least four strings are secured by corresponding first and second string holders and run along the top portion between the first end of the elongate handle and the second end of the elongate handle;

wherein the first side includes a first side recessed portion that runs along the first side;

a slidable cover component, the slidable cover component slidable over the top portion to cover or expose the at least four strings, the slidable cover component including a first cover side, the first cover side having first one or more guide members configured in size and shape to slidably engage within the first side recessed portion;

sensors for detecting one or more of: finger positions on the fret board and string to fret contact on the fret board;

a comparison module for determining if the detected one or more of finger positions and string to fret contact form an appropriate musical note or musical chord; and a visual indicator that indicates if the detected one or more of finger positions and string to fret contact form an appropriate musical note or musical chord based on the determination.

2. The electronic device of claim 1, wherein the sensors include one or more of: touch sensitive material, pressure sensitive material, a resistor network, and a resistance detector.

3. The electronic device of claim 1, wherein the visual indicator is a selected from among: a multi-color LED and a display.

4. The electronic device as of claim 1, further comprising:
a second at least four strings secured to the slidable cover component, the second at least four strings corresponding to the first at least four strings, the second at least four strings for strumming;
one or more second sensors for detecting when strings from among the second at least four strings are strummed; and
an audio output device for outputting sound data based on the detected one or more of finger positions and string to fret contacts and string strumming data.

5. The electronic device as recited in claim 4, further comprising:
a plurality of additional visual indication components embedded in the fret board; and
a finger indication module configured to illuminate one or more of the plurality of additional visual indication components to indicate where one or more fingers are to be placed on the fret board to form a musical note or chord.

6. The electronic device as recited in claim 1, further comprising:
a plurality of additional visual indication components embedded in the fret board; and
a finger indication module configured to illuminate one or more of the plurality of additional visual indication components to indicate where one or more fingers are to be placed on the fret board to form a musical note or chord.

7. The electronic device as recited in claim 1, further comprising a communication component for communicating with other computing devices.

8. An electronic device used to practice a stringed musical instrument, the device comprising:
an elongate handle representing a neck portion of the stringed musical instrument, the elongate handle including a first end, a second end, a first side, a second side, and a top portion, the top portion including a plurality of frets representing a portion of a fret board, the elongate handle sized and configured to fit in the hand of a user of the device, the first end representing the end of the stringed musical instrument where string tension is adjusted;
at least four strings;
for each of the at least four strings:
a first string holder at the first end for holding the string in place; and
a second string holder at the second end for holding the string in place;
wherein the at least four strings are secured by corresponding first and second string holders and run along the top portion between the first end of the elongate handle and the second end of the elongate handle;
wherein the first side includes a first side recessed portion that runs along the first side;
a slidable cover component, the slidable cover component slidable over the top portion to cover or expose the at least four strings, the slidable cover component including a first cover side, the first cover side having first one or more guide members configured in size and shape to slidably engage within the first side recessed portion;
a second at least four strings secured to the slidable cover component, the second at least four strings corresponding to the first at least four strings, the second at least four strings for strumming;
one or more sensors for detecting when strings from among the second at least four strings are strummed; and
an audio output device for outputting sound data based on detected string strumming data.

9. The electronic device of claim 8, wherein the one or more sensors for detecting when strings from among the second at least four strings are strummed comprises a pickup.

10. The electronic device of claim 9, wherein the pickup comprises a single output pickup, the single output pickup outputting a combined indication of strummed strings when one or more strings in the second at least four strings is strummed; and further comprising:
a string mapping module that uses fourier transforms to separate phase and time domain data for each of the second at least four strings.

11. The electronic device of claim 9, wherein the pickup comprises a hexaphonic pickup.

12. The electronic device of claim 8, wherein the one or more sensors for detecting when strings from among the second at least four strings are strummed comprises one or more vibration sensors for detecting vibrations in the second at least four strings.

13. The electronic device as recited in claim 8, wherein the one or more sensors for detecting when strings from among the second at least four strings are strummed comprises one or more capacitive sensors for detecting changes in capacitance in the second at least four strings.

14. The electronic device as recited in claim 8, further comprising a communication component for communicating with other computing devices.

15. An electronic device used to practice a stringed musical instrument, the device comprising:
an elongate handle representing a neck portion of the stringed musical instrument, the elongate handle including a first end, a second end, a first side, a second side, and a top portion, the top portion including a plurality of frets representing a portion of a fret board, the elongate handle sized and configured to fit in the hand of a user of the device, the first end representing the end of the stringed musical instrument where string tension is adjusted;
at least four strings;
for each of the at least four strings:
a first string holder at the first end for holding the string in place; and
a second string holder at the second end for holding the string in place;
wherein the at least four strings are secured by corresponding first and second string holders and run along the top portion between the first end of the elongate handle and the second end of the elongate handle;
wherein the first side includes a first side recessed portion that runs along the first side;
a slidable cover component, the slidable cover component slidable over the top portion to cover or expose the at least four strings, the slidable cover component including a first cover side, the first cover side having first one or more guide members configured in size and shape to slidably engage within the first side recessed portion;

visual indication components embedded in the fret board; and a finger indication module configured to illuminate one or more visual indication components to indicate where fingers are to be placed on the fret board to form a musical note or musical chord.

16. The electronic device of claim 15, wherein the visual indication components embedded in the fret board comprise multi-color LEDs embedded in the fret board.

17. The electronic device of claim 15, wherein the multi-color LEDs embedded in the fret board comprises at least one row of multi-color LEDs per fret wherein each multi-color LED in a row corresponds to one of the at least four strings.

18. The electronic device as recited in claim 16, further comprising a partially opaque material covering the multi-color LEDs such that the multi-color LEDs are not visible when not illuminated.

19. The electronic device as recited in claim 16, further comprising a communication component for communicating with other computing devices.

* * * * *